(12) United States Patent
Song

(10) Patent No.: US 12,316,952 B2
(45) Date of Patent: May 27, 2025

(54) PHOTO PREVIEW METHOD, ELECTRONIC DEVICE, AND STORAGE MEDIUM

(71) Applicant: HUAWEI TECHNOLOGIES CO., LTD., Guangdong (CN)

(72) Inventor: Lang Song, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 281 days.

(21) Appl. No.: 17/907,677

(22) PCT Filed: Apr. 6, 2021

(86) PCT No.: PCT/CN2021/085580
§ 371 (c)(1),
(2) Date: Sep. 29, 2022

(87) PCT Pub. No.: WO2021/204103
PCT Pub. Date: Oct. 14, 2021

(65) Prior Publication Data
US 2023/0125072 A1    Apr. 27, 2023

(30) Foreign Application Priority Data

Apr. 7, 2020 (CN) .......................... 202010266321.1

(51) Int. Cl.
*H04N 23/63* (2023.01)
*G06F 3/04845* (2022.01)
*H04N 23/62* (2023.01)

(52) U.S. Cl.
CPC ....... *H04N 23/632* (2023.01); *G06F 3/04845* (2013.01); *H04N 23/62* (2023.01)

(58) Field of Classification Search
CPC .... H04N 23/632; H04N 23/62; H04N 23/633; H04N 23/631; G06F 3/04845
See application file for complete search history.

(56) References Cited

U.S. PATENT DOCUMENTS 4,020,484 A * 4/1977 Caspari ................... G09G 5/24
345/472
7,032,172 B1 * 4/2006 Lee ..................... G06F 16/9577
707/E17.121

(Continued)

FOREIGN PATENT DOCUMENTS

CN    103024156 A    4/2013
CN    104333689 A    2/2015
(Continued)

*Primary Examiner* — Chiawei Chen

(57) ABSTRACT

This application discloses a photo preview method, an electronic device, and a storage medium. The photo preview method includes: obtaining a photographing instruction, and taking a first photo according to the photographing instruction; displaying a floating thumbnail of the first photo in a photographing interface based on the first photo, the floating thumbnail having a floating effect; and scaling down the floating thumbnail to a stationary thumbnail if no image operation instruction is obtained in a display region of the floating thumbnail within a preset time period, or performing an operation on the floating thumbnail according to the image operation instruction if the image operation instruction is obtained in the display region of the floating thumbnail within the preset time period. According to the photo preview method, a photo preview effect can be significantly improved.

19 Claims, 12 Drawing Sheets

(56) References Cited

U.S. PATENT DOCUMENTS

| | | | | |
|---|---|---|---|---|
| 8,780,140 B2* | 7/2014 | Endo | | G06F 3/0485 |
| | | | | 345/666 |
| 8,838,180 B2* | 9/2014 | Do | | G06F 3/0482 |
| | | | | 455/418 |
| 9,507,469 B2* | 11/2016 | Miyazawa | | G06F 3/041 |
| 9,519,376 B2* | 12/2016 | Han | | G06F 3/04883 |
| 9,733,954 B2 | 8/2017 | Schechter et al. | | |
| 9,977,590 B2* | 5/2018 | Kim | | G06V 40/172 |
| 10,311,130 B1* | 6/2019 | Kumar | | G06T 13/80 |
| 10,592,103 B2* | 3/2020 | Choi | | H04M 1/72427 |
| 2003/0142082 A1* | 7/2003 | Spalding | | G06F 3/0481 |
| | | | | 345/175 |
| 2006/0041848 A1* | 2/2006 | Lira | | G06Q 10/107 |
| | | | | 715/805 |
| 2007/0109323 A1* | 5/2007 | Nakashima | | G09G 5/14 |
| | | | | 345/661 |
| 2007/0180394 A1* | 8/2007 | Hedrick | | G09G 3/20 |
| | | | | 244/75.1 |
| 2007/0236477 A1* | 10/2007 | Ryu | | G06F 3/03547 |
| | | | | 345/173 |
| 2011/0116769 A1* | 5/2011 | Sugiyama | | G11B 27/326 |
| | | | | 386/E5.028 |
| 2011/0164042 A1* | 7/2011 | Chaudhri | | G06F 3/0481 |
| | | | | 715/702 |
| 2012/0136892 A1* | 5/2012 | Ajima | | G06F 16/951 |
| | | | | 707/769 |
| 2012/0206495 A1* | 8/2012 | Endo | | G06F 3/0485 |
| | | | | 345/666 |
| 2014/0043355 A1 | 2/2014 | Kim et al. | | |
| 2014/0071323 A1* | 3/2014 | Yi | | G06F 3/0486 |
| | | | | 348/333.01 |
| 2015/0002436 A1* | 1/2015 | Yano | | G06F 3/0416 |
| | | | | 345/173 |
| 2015/0138213 A1* | 5/2015 | Turner | | G09G 3/002 |
| | | | | 345/520 |
| 2015/0281660 A1* | 10/2015 | Natori | | G06F 3/04842 |
| | | | | 348/744 |
| 2017/0060225 A1* | 3/2017 | Zha | | G06F 1/3212 |
| 2017/0242561 A1* | 8/2017 | Ochi | | G06F 3/04842 |
| 2018/0203596 A1* | 7/2018 | Dhaliwal | | G06F 3/04817 |
| 2020/0090302 A1* | 3/2020 | Ichimi | | G06F 3/0485 |
| 2021/0200424 A1* | 7/2021 | Therrien | | G06F 3/0488 |
| 2023/0131307 A1* | 4/2023 | Lu | | H04N 23/62 |
| | | | | 348/333.02 |
| 2023/0214108 A1* | 7/2023 | Jho | | G09G 5/373 |
| | | | | 345/660 |

FOREIGN PATENT DOCUMENTS

| | | | | |
|---|---|---|---|---|
| CN | 105681648 A | 6/2016 | | |
| CN | 105892868 A | 8/2016 | | |
| CN | 106131394 A | 11/2016 | | |
| CN | 106293338 A | 1/2017 | | |
| CN | 108108114 A | 6/2018 | | |
| CN | 108153900 A | 6/2018 | | |
| CN | 108170348 A | 6/2018 | | |
| CN | 108958580 A | 12/2018 | | |
| CN | 109413333 A | 3/2019 | | |
| CN | 109726179 A | 5/2019 | | |
| CN | 110401766 A | 11/2019 | | |
| CN | 110677586 A | 1/2020 | | |
| CN | 110908558 A | 3/2020 | | |
| CN | 109413333 B * | 4/2022 | | H04M 1/0264 |
| EP | 2779629 A1 | 9/2014 | | |
| EP | 4009624 A1 | 6/2022 | | |

* cited by examiner

PHOTO PREVIEW METHOD, ELECTRONIC DEVICE, AND STORAGE MEDIUM

CROSS-REFERENCE TO RELATED APPLICATIONS

This application is a national stage of International Application No. PCT/CN2021/085580, filed on Apr. 6, 2021, which claims priority to Chinese Patent 202010266321.1, filed on Apr. 7, 2020. The disclosures of the aforementioned applications are hereby incorporated by reference in their entireties.

TECHNICAL FIELD

This application relates to the photographing field, and in particular, to a photo preview method, an electronic device, and a storage medium.

BACKGROUND

In the conventional technology, to help a user perform an operation on a just taken photo, a thumbnail is displayed in a lower left corner of a photographing interface after photographing ends, to implement photo preview. Such a thumbnail is usually displayed in a fixed and static manner, and may be referred to as a stationary thumbnail. A display region of such a stationary thumbnail is usually very small, and little information can be directly seen from the stationary thumbnail. Therefore, it cannot be determined whether the just taken photo has a problem such as blurring or underexposure, and a preview effect is poor.

SUMMARY

In view of this, embodiments of this application provide a photo preview method, an electronic device, and a storage medium, to resolve a problem of a poor photo preview effect in the conventional technology.

According to a first aspect, an embodiment of this application provides a photo preview method, including:
  obtaining a photographing instruction: and taking a first photo according to the photographing instruction;
  displaying a floating thumbnail of the first photo in a photographing interface, the floating thumbnail having a floating effect; and
  scaling down the floating thumbnail to a stationary thumbnail if an image operation instruction is not obtained in a display region of the floating thumbnail within a preset time period, or
  performing an operation on the floating thumbnail according to the image operation instruction if the image operation instruction is obtained in the display region of the floating thumbnail within the preset time period.

According to the foregoing aspect and any implementation, an implementation is further provided. The image operation instruction includes an image tapping operation instruction and an image sliding operation instruction, the image sliding operation instruction includes an image sliding up operation instruction and an image sliding down operation instruction, the image tapping operation instruction is obtained based on a tapping operation in the display region of the floating thumbnail, and the image sliding operation instruction is obtained based on a sliding operation in the display region of the floating thumbnail.

According to the foregoing aspect and any implementation, an implementation is further provided. The performing the operation on the floating thumbnail according to the image operation instruction if the image operation instruction is obtained in the display region of the floating thumbnail within the preset time period includes:
  if the image tapping operation instruction is obtained in the display region of the floating thumbnail within the preset time period, opening, according to the image tapping operation instruction, the first photo corresponding to the floating thumbnail; or
  performing an image sliding operation on the floating thumbnail according to the image sliding operation instruction if the image sliding operation instruction is obtained in the display region of the floating thumbnail within the preset time period.

According to the foregoing aspect and any implementation, an implementation is further provided. The performing the image sliding operation on the floating thumbnail according to the image sliding operation instruction if the image sliding operation instruction is obtained in the display region of the floating thumbnail within the preset time period includes:
  if the image sliding up operation instruction is obtained in the display region of the floating thumbnail within the preset time period, sharing, according to the image sliding up operation instruction when a sliding speed reaches a first threshold or a sliding distance reaches a second threshold, the first photo corresponding to the floating thumbnail, where the sliding speed is an instantaneous speed at an instant at which the image sliding operation instruction is lost, and the sliding distance is a sliding displacement from an instant at which the image sliding operation instruction is obtained to the instant at which the image sliding operation instruction is lost; or
  if the image sliding down operation instruction is obtained in the display region of the floating thumbnail within the preset time period, deleting, according to the image sliding down operation instruction when the sliding speed reaches a third threshold or the sliding distance reaches a fourth threshold, the first photo corresponding to the floating thumbnail, where the sliding speed is an instantaneous speed at an instant at which the image sliding operation instruction is lost, and the sliding distance is the sliding displacement from an instant at which the image sliding operation instruction is obtained to the instant at which the image sliding operation instruction is lost.

According to the foregoing aspect and any implementation, an implementation is further provided. If the image sliding up operation instruction is obtained in the display region of the floating thumbnail, before the sliding distance reaches the second threshold, a first function prompt is displayed above the floating thumbnail, the first function prompt prompting a user with an operation to be performed when the sliding distance reaches the second threshold, a display effect of the first function prompt is improved as the sliding distance increases, and the first function prompt includes a function prompt of a text type and a function prompt of an icon type.

According to the foregoing aspect and any implementation, an implementation is further provided. If the image sliding down operation instruction is obtained in the display region of the floating thumbnail, before the sliding distance reaches the fourth threshold, a second function prompt is displayed below the floating thumbnail, the second function prompt prompting a user with an operation to be performed when the sliding distance reaches the fourth threshold, a display effect of the second function prompt is improved as the sliding distance increases, and the second function prompt includes a function prompt of a text type and a function prompt of an icon type.

According to the foregoing aspect and any implementation, an implementation is further provided. The performing the operation on the floating thumbnail according to the image sliding operation instruction if the image sliding operation instruction is obtained in the display region of the floating thumbnail within the preset time period includes:
- if the image sliding up operation instruction is obtained in the display region of the floating thumbnail within the preset time period, displaying, according to the image sliding up operation instruction, a popover preview based on the floating thumbnail when a sliding speed reaches a fifth threshold or a sliding distance reaches a sixth threshold, where the sliding speed is an instantaneous speed at an instant at which the image sliding operation instruction is lost, and the sliding distance is a sliding displacement from an instant at which the image sliding operation instruction is obtained to the instant at which the image sliding operation instruction is lost; or
- if the image sliding down operation instruction is obtained in the display region of the floating thumbnail within the preset time period, scaling down the floating thumbnail to the stationary thumbnail according to the image sliding down operation instruction when a sliding speed reaches a seventh threshold or a sliding distance reaches an eighth threshold, where the sliding speed is an instantaneous speed at an instant at which the image sliding operation instruction is lost, and the sliding distance is a sliding displacement from an instant at which the image sliding operation instruction is obtained to the instant at which the image sliding operation instruction is lost.

According to the foregoing aspect and any implementation, an implementation is further provided. The displaying the popover preview based on the floating thumbnail includes:
- scaling up the floating thumbnail and moving the floating thumbnail to a preset display region of the popover preview, scaling up or replacing the floating thumbnail in the preset display region, and displaying the popover preview in a preset size, where when the popover preview is displayed, a sharing control and a deletion control are displayed below the popover preview.

According to the foregoing aspect and any implementation, an implementation is further provided. The method further includes:
- when the floating thumbnail of the first photo is displayed, if the photographing instruction is obtained again, taking a second photo according to the photographing instruction; and
- scaling down the displayed floating thumbnail of the first photo to the stationary thumbnail, and displaying a second floating thumbnail of the second photo in the photographing interface based on the second photo, where a generation animation effect is used for displaying the second floating thumbnail of the second photo, and a scaling down animation effect of scaling down the displayed floating thumbnail of the first photo to the stationary thumbnail and the generation animation effect of displaying the second floating thumbnail of the second photo in the photographing interface are simultaneously displayed.

According to the foregoing aspect and any implementation, an implementation is further provided. The method further includes:
- when the floating thumbnail of the first photo is displayed, if the photographing instruction is obtained again, taking a second photo according to the photographing instruction; and
- displaying a second floating thumbnail of the second photo in the photographing interface based on the second photo, where the second floating thumbnail of the second photo partially covers the floating thumbnail of the first photo.

According to the foregoing aspect and any implementation, an implementation is further provided. The method further includes:
- when the photographing instruction is continuously obtained and photos are continuously obtained within the preset time period, displaying floating thumbnails of the photos in the photographing interface based on the photos, where a quantity of displayed floating thumbnails of the photos does not exceed a ninth threshold.

According to the foregoing aspect and any implementation, an implementation is further provided. The method further includes:
- when the quantity of floating thumbnails that are of the photos and that are displayed in the photographing interface is greater than 1, the image operation instruction is performed on a particular floating thumbnail that is of a particular photo and that is displayed on the top of the photographing interface; and
- when a sliding up operation or a sliding down operation is performed, according to the image sliding up operation instruction or the image sliding down operation instruction, on the particular floating thumbnail that is of the particular photo and that is displayed on the top, a countdown within the preset time period is suspended for all the floating thumbnails of the photos, and when a deletion operation is triggered, according to the image sliding down operation instruction, on the particular floating thumbnail that is of the particular photo and that is displayed on the top, the countdown within the preset time period is refreshed for a remaining floating thumbnail of a photo.

According to the foregoing aspect and any implementation, an implementation is further provided. The method further includes:
- when the quantity of floating thumbnails that are of the photos and that are displayed in the photographing interface is greater than 1, the image operation instruction is performed on the particular floating thumbnail that is of a photo and that is displayed on the top of the photographing interface; and
- when a popover preview is displayed according to the image sliding up operation instruction based on the particular floating thumbnail that is of the particular photo and that is displayed on the top, the popover preview is displayed based on the quantity of floating thumbnails of the photos, where switching of the popover preview is implemented by obtaining a left sliding instruction or a right sliding instruction.

According to the foregoing aspect and any implementation, an implementation is further provided. The method further includes:
- the sharing control and the deletion control are displayed below the popover preview, and when a sharing instruction or a deletion instruction is obtained, the sharing instruction or the deletion instruction is performed on the currently displayed popover preview.

According to the foregoing aspect and any implementation, an implementation is further provided. The displaying the floating thumbnail of the first photo in the photographing interface based on the first photo, the floating thumbnail having a floating effect includes:

scaling down the first photo displayed in a viewfinder interface of a photographing viewfinder frame, and moving the first photo to a preset display region of the floating thumbnail; or restoring the viewfinder interface of the photographing viewfinder frame, and scaling up and putting the scaled-down first photo in the preset display region of the floating thumbnail, so that a size of the scaled-up first photo is consistent with a size of the preset display region, where a size of the scaled-down first photo is less than the size of the preset display region.

According to the foregoing aspect and any implementation, an implementation is further provided. The floating effect is implemented by using a breathing animation effect, the breathing animation effect is used for the floating thumbnail of the first photo within a specified time period of a generation and display phase, and the breathing animation effect is an alternate operation of continuously scaling down and scaling up an image during display, or is a cyclic operation of reciprocating the image in one direction during display.

According to the foregoing aspect and any implementation, an implementation is further provided. When the popover preview is displayed, a display background of the photographing interface is displayed in a blurred manner.

According to a second aspect, an electronic device is provided, and includes a memory storing instructions and at least one processor in communication with the memory, the at least one processor configured, upon execution of the instructions, to perform the following steps:

obtaining a photographing instruction, and taking a first photo according to the photographing instruction;

displaying a floating thumbnail of the first photo in a photographing interface, the floating thumbnail having a floating effect; and scaling down the floating thumbnail to a stationary thumbnail if an image operation instruction is not obtained in a display region of the floating thumbnail within a preset time period, or performing an operation on the floating thumbnail according to the image operation instruction if the image operation instruction is obtained in the display region of the floating thumbnail within the preset time period.

According to the foregoing aspect and any implementation, an implementation is further provided. The image operation instruction includes an image tapping operation instruction and an image sliding operation instruction, the image sliding operation instruction includes an image sliding up operation instruction and an image sliding down operation instruction, the image tapping operation instruction is obtained based on a tapping operation in the display region of the floating thumbnail, and the image sliding operation instruction is obtained based on a sliding operation in the display region of the floating thumbnail.

According to the foregoing aspect and any implementation, an implementation is further provided. When the processor executes the computer program to perform the operation on the floating thumbnail according to the image operation instruction if the image operation instruction is obtained in the display region of the floating thumbnail within the preset time period, the following includes are included:

if the image tapping operation instruction is obtained in the display region of the floating thumbnail within the preset time period, opening, according to the image tapping operation instruction, the first photo corresponding to the floating thumbnail; or performing an operation on the floating thumbnail according to the image sliding operation instruction if the image sliding operation instruction is obtained in the display region of the floating thumbnail within the preset time period.

According to the foregoing aspect and any implementation, an implementation is further provided. When the processor executes the computer program to perform the operation on the floating thumbnail according to the image sliding operation instruction if the image sliding operation instruction is obtained in the display region of the floating thumbnail, the following steps are included:

if the image sliding up operation instruction is obtained in the display region of the floating thumbnail within the preset time period, sharing, according to the image sliding up operation instruction when a sliding speed reaches a first threshold or a sliding distance reaches a second threshold, the first photo corresponding to the floating thumbnail, where the sliding speed is an instantaneous speed at an instant at which the image sliding operation instruction is lost, and the sliding distance is a sliding displacement from an instant at which the image sliding operation instruction is obtained to the instant at which the image sliding operation instruction is lost; or if the image sliding down operation instruction is obtained in the display region of the floating thumbnail within the preset time period, deleting, according to the image sliding down operation instruction when a sliding speed reaches a third threshold or a sliding distance reaches a fourth threshold, the first photo corresponding to the floating thumbnail, where the sliding speed is an instantaneous speed at an instant at which the image sliding operation instruction is lost, and the sliding distance is a sliding displacement from an instant at which the image sliding operation instruction is obtained to the instant at which the image sliding operation instruction is lost.

According to the foregoing aspect and any implementation, an implementation is further provided. If the image sliding up operation instruction is obtained in the display region of the floating thumbnail, before the sliding distance reaches the second threshold, a first function prompt is displayed above the floating thumbnail, where the first function prompt is used to prompt a user with an operation to be performed when the sliding distance reaches the second threshold, a display effect of the first function prompt is improved as the sliding distance increases, and the first function prompt includes a function prompt of a text type and a function prompt of an icon type.

According to the foregoing aspect and any implementation, an implementation is further provided. If the image sliding down operation instruction is obtained in the display region of the floating thumbnail, before the sliding distance reaches the fourth threshold, a second function prompt is displayed below the floating thumbnail, where the second function prompt is used to prompt a user with an operation to be performed when the sliding distance reaches the fourth threshold, a display effect of the second function prompt is improved as the sliding distance increases, and the second function prompt includes a function prompt of a text type and a function prompt of an icon type.

According to the foregoing aspect and any implementation, an implementation is further provided. When the processor executes the computer program to perform the operation on the floating thumbnail according to the image sliding operation instruction if the image sliding operation instruction is obtained in the display region of the floating thumbnail, the following steps are included:

if the image sliding up operation instruction is obtained in the display region of the floating thumbnail within the preset time period, displaying, according to the image sliding up operation instruction, a popover preview based on the floating thumbnail when a sliding speed reaches a fifth threshold or a sliding distance reaches a sixth threshold, where the sliding speed is an instantaneous speed at an instant at which the image sliding operation instruction is lost, and the sliding distance is a sliding displacement from an instant at which the image sliding operation instruction is obtained to the instant at which the image sliding operation instruction is lost; or if the image sliding down operation instruction is obtained in the display region of the floating thumbnail within the preset time period, scaling down the floating thumbnail to the stationary thumbnail according to the image sliding down operation instruction when a sliding speed reaches a seventh threshold or a sliding distance reaches an eighth threshold, where the sliding speed is an instantaneous speed at an instant at which the image sliding operation instruction is lost, and the sliding distance is a sliding displacement from an instant at which the image sliding operation instruction is obtained to the instant at which the image sliding operation instruction is lost.

According to the foregoing aspect and any implementation, an implementation is further provided. When the processor executes the computer program to display the popover preview based on the floating thumbnail, the following steps are included:

scaling up the floating thumbnail and moving the floating thumbnail to a preset display region of the popover preview, scaling up or replacing the floating thumbnail in the preset display region, and displaying the popover preview in a preset size, where when the popover preview is displayed, a sharing control and a deletion control are displayed below the popover preview.

According to the foregoing aspect and any implementation, an implementation is further provided. The processor executes the computer program to further implement the following steps:

when the floating thumbnail of the first photo is displayed, if the photographing instruction is obtained again, taking a second photo according to the photographing instruction; and scaling down the displayed floating thumbnail of the first photo to the stationary thumbnail, and displaying a floating thumbnail of the second photo in the photographing interface based on the second photo, where a generation animation effect is used for displaying the floating thumbnail of the second photo, and a scaling down animation effect of scaling down the displayed floating thumbnail of the first photo to the stationary thumbnail and the generation animation effect of displaying the floating thumbnail of the second photo in the photographing interface are simultaneously played.

According to the foregoing aspect and any implementation, an implementation is further provided. The processor executes the computer program to further implement the following steps:

when the floating thumbnail of the first photo is displayed, if the photographing instruction is obtained again, taking a second photo according to the photographing instruction; and displaying a floating thumbnail of the second photo in the photographing interface based on the second photo, where the floating thumbnail of the second photo partially covers the floating thumbnail of the first photo.

According to the foregoing aspect and any implementation, an implementation is further provided. The processor executes the computer program to further implement the following step:

when the photographing instruction is continuously obtained and photos are continuously obtained within the preset time period, displaying floating thumbnails of the photos in the photographing interface based on the photos, where a quantity of displayed floating thumbnails of the photos does not exceed a ninth threshold.

According to the foregoing aspect and any implementation, an implementation is further provided. The processor executes the computer program to further implement the following step:

when the quantity of floating thumbnails that are of the photos and that are displayed in the photographing interface is greater than 1, the image operation instruction is performed on a floating thumbnail that is of a photo and that is displayed on the top of the photographing interface; and when a sliding up operation or a sliding down operation is performed, according to the image sliding up operation instruction or the image sliding down operation instruction, on the floating thumbnail that is of the photo and that is displayed on the top, a countdown within the preset time period is suspended for all the floating thumbnails of the photos, and when a deletion operation is triggered, according to the image sliding down operation instruction, on the floating thumbnail that is of the photo and that is displayed on the top, the countdown within the preset time period is refreshed for a remaining floating thumbnail of a photo.

According to the foregoing aspect and any implementation, an implementation is further provided. The processor executes the computer program to further implement the following step:

when the quantity of floating thumbnails that are of the photos and that are displayed in the photographing interface is greater than 1, the image operation instruction is performed on a floating thumbnail that is of a photo and that is displayed on the top of the photographing interface; and when a popover preview is displayed according to the image sliding up operation instruction based on the floating thumbnail that is of the photo and that is displayed on the top, the popover preview is displayed based on the quantity of floating thumbnails of the photos, where switching of the popover preview is implemented by obtaining a left sliding instruction or a right sliding instruction.

According to the foregoing aspect and any implementation, an implementation is further provided. The processor executes the computer program to further implement the following step:

the sharing control and the deletion control are displayed below the popover preview, and when a sharing instruction or a deletion instruction is obtained, the sharing instruction or the deletion instruction is performed on the currently displayed popover preview.

According to the foregoing aspect and any implementation, an implementation is further provided. When the processor executes the computer program to display the floating thumbnail of the first photo in the photographing interface based on the first photo, where the floating thumbnail has the floating effect, the following steps are included:

scaling down the first photo displayed in a viewfinder interface of a photographing viewfinder frame, and moving the first photo to a preset display region of the floating thumbnail; or restoring the viewfinder interface of the photographing viewfinder frame, and scaling up and putting the scaled-down first photo in the preset display region of the floating thumbnail, so that a size of the scaled-up first photo is consistent with a size of the preset display region, where a size of the scaled-down first photo is less than the size of the preset display region.

According to the foregoing aspect and any implementation, an implementation is further provided. The floating effect is implemented by using a breathing animation effect, the breathing animation effect is used for the floating thumbnail of the first photo within a specified time period of a generation and display phase, and the breathing animation effect is an alternate operation of continuously scaling down and scaling up an image during display, or is a cyclic operation of reciprocating the image in one direction during display.

According to the foregoing aspect and any implementation, an implementation is further provided. When the popover preview is displayed, a display background of the photographing interface is displayed in a blurred manner.

According to a third aspect, an embodiment of this application provides a nonvolatile computer-readable storage medium, including a computer program. When the computer program is executed by a processor, steps of the method according to the first aspect are implemented.

In embodiments of this application, photo preview is implemented by using the floating thumbnail. Compared with a thumbnail in the conventional technology, the floating thumbnail has a larger display area. This helps the user determine quality of a just taken photo from the floating thumbnail in a preview scenario, and can further improve tapping efficiency. The floating thumbnail further has a dynamic floating effect, and the user may pay more sensitive attention to generation of the floating thumbnail, to perform more operations based on the floating thumbnail. In embodiments of this application, a photo preview effect is significantly improved.

BRIEF DESCRIPTION OF DRAWINGS

To describe technical solutions in embodiments of this application more clearly, the following briefly describes the accompanying drawings for embodiments. It is clear that the accompanying drawings in the following descriptions show merely some embodiments of this application, and a person of ordinary skill in the art may derive other drawings from these accompanying drawings without creative efforts.

DESCRIPTION OF EMBODIMENTS

The following describes technical solutions in embodiments of this application with reference to the accompanying drawings in embodiments of this application. In descriptions of embodiments of this application, "/" means or unless otherwise specified. For example, AB may represent A or B. In this specification, "and/or" describes only an association relationship for describing associated objects and represents that three relationships may exist. For example, A and/or B may represent the following three cases: Only A exists, both A and B exist, and only B exists.

The terms "first" and "second" mentioned below are merely intended for the purpose of description, and shall not be understood as an indication or implication of relative importance or implicit indication of a quantity of indicated technical features. Therefore, a feature restricted by "first" or "second" may explicitly or implicitly include one or more features. In descriptions of embodiments of this application, "a plurality of" means two or more unless otherwise specified.

In embodiments of this application, the word such as "example" or "for example" is used to represent giving an example, an illustration, or a description. Any embodiment or design solution described as an "example" or "for example" in embodiments of this application should not be explained as being more preferred or having more advantages than another embodiment or design solution. Exactly, use of the word such as "example" or "for example" is intended to present a related concept in a specific manner.

Figure 1:
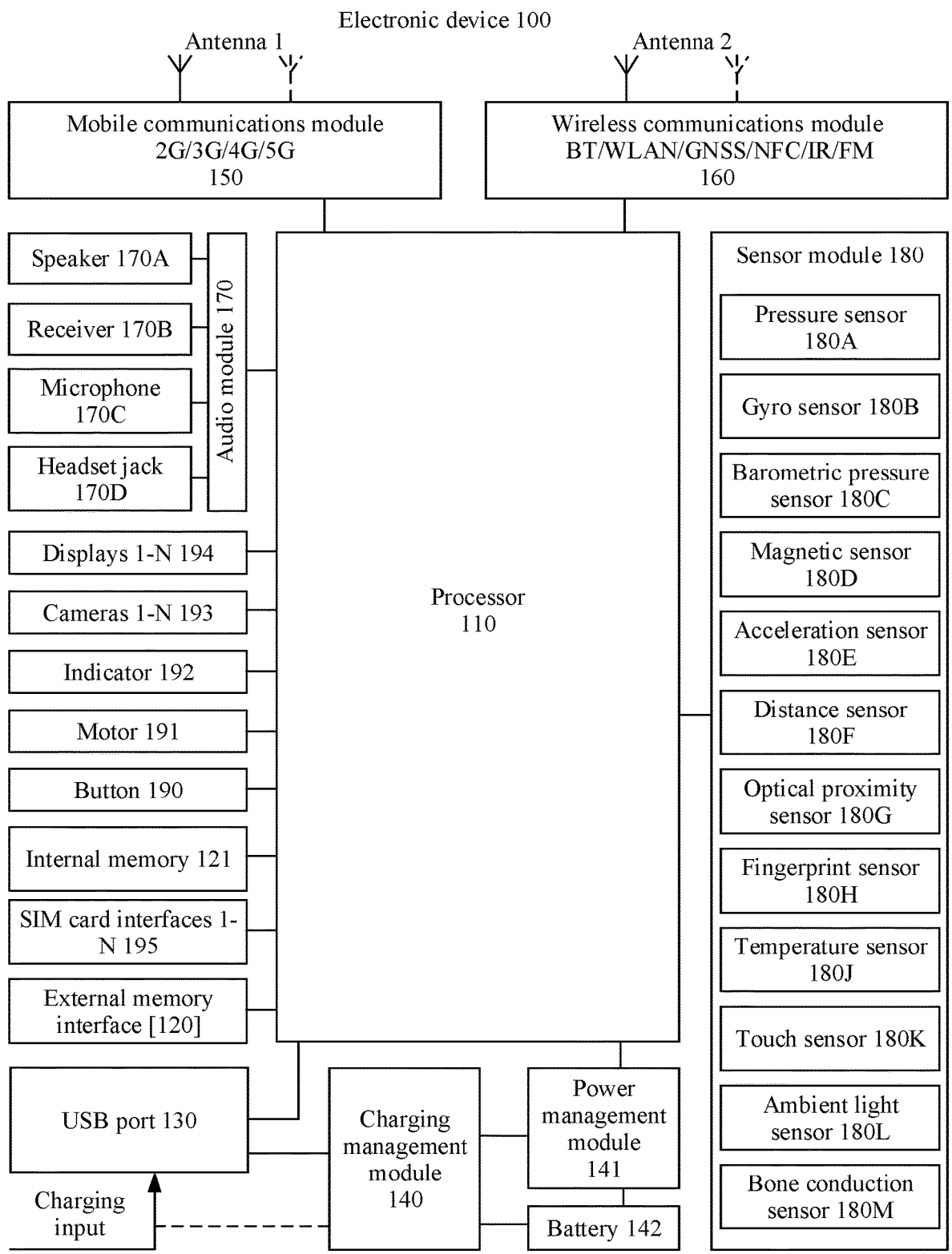
FIG. 1 is a diagram of a structure of an electronic device according to an embodiment of this application.

FIG. 1 is a diagram of a structure of an electronic device 100.

The electronic device 100 may include a processor 110, an external memory interface 120, an internal memory 121, a universal serial bus (USB) port 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of this application constitutes no specific limitation on the electronic device 100. In some other embodiments of this application, the electronic device 100 may include more or fewer components than those shown in the figure, or may combine some components, or may split some components, or may have different component arrangements. The components in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, and/or a neural-network processing unit (NPU). Different processing units may be independent components, or may be integrated into one or more processors.

The controller may generate an operation control signal based on instruction operation code and a time sequence signal, to complete control of instruction reading and instruction execution.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identification module (SIM) interface, a universal serial bus (USB) port, and/or the like.

The I2C interface is a two-way synchronization serial bus, and includes a serial data line (SDA) and a serial clock line (SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be used for audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communications module 160 through the I2S interface, to implement a function of answering a call through a Bluetooth headset.

The PCM interface may also be used for audio communication, and samples, quantizes, and codes an analog signal. In some embodiments, the audio module 170 may be coupled to the wireless communications module 160 through a PCM bus interface. In some embodiments, the audio module 170 may also transmit an audio signal to the wireless communications module 160 through the PCM interface, to implement a function of answering a call through a Bluetooth headset. Both the I2S interface and the PCM interface may be used for audio communication.

The UART interface is a universal serial data bus, and is used for asynchronous communication. The bus may be a two-way communications bus. The bus converts to-be-transmitted data between serial communication and parallel communication. In some embodiments, the UART interface is usually configured to connect the processor 110 to the wireless communications module 160. For example, the processor 110 communicates with a Bluetooth module in the wireless communications module 160 through the UART interface, to implement a Bluetooth function. In some embodiments, the audio module 170 may transmit an audio signal to the wireless communications module 160 through the UART interface, to implement a function of playing music through a Bluetooth headset.

The MIPI interface may be configured to connect the processor 110 to a peripheral component such as the display 194 or the camera 193. The MIPI interface includes a camera serial interface (CSI), a display serial interface (DSI), and the like. In some embodiments, the processor 110 communicates with the camera 193 through the CSI, to implement a photographing function of the electronic device 100. The processor 110 communicates with the display 194 through the DSI, to implement a display function of the electronic device 100.

The GPIO interface may be configured by software. The GPIO interface may be configured as a control signal or a data signal. In some embodiments, the GPIO interface may be configured to connect the processor 110 to the camera 193, the display 194, the wireless communications module 160, the audio module 170, the sensor module 180, or the like. The GPIO interface may alternatively be configured as an I2C interface, an I2S interface, a UART interface, an MIPI interface, or the like.

The USB port 130 is a port that conforms to a USB standard specification, and may be a mini USB port, a micro USB port, a USB Type-C port, or the like. The USB port 130 may be configured to connect to a charger to charge the electronic device 100, or may be configured to transmit data between the electronic device 100 and a peripheral device. The USB port 130 may alternatively be configured to connect to a headset, to play audio by using the headset. The port may alternatively be configured to connect to another electronic device such as an AR device.

It may be understood that an interface connection relationship between the modules illustrated in this embodiment of this application is merely an example for description, and constitutes no limitation on the structure of the electronic device 100. In some other embodiments of this application, the electronic device 100 may alternatively use an interface connection manner different from that in the foregoing embodiment, or use a combination of a plurality of interface connection manners.

The charging management module 140 is configured to receive a charging input from the charger. The charger may be a wireless charger or a wired charger. In some embodiments of wired charging, the charging management module 140 may receive a charging input from the wired charger through the USB port 130. In some embodiments of wireless charging, the charging management module 140 may receive a wireless charging input through a wireless charging coil of the electronic device 100. The charging management module 140 supplies power to the electronic device through the power management module 141 while charging the battery 142.

The power management module 141 is configured to connect to the battery 142, the charging management module 140, and the processor 110. The power management module 141 receives an input from the battery 142 and/or the charging management module 140, and supplies power to the processor 110, the internal memory 121, the display 194, the camera 193, the wireless communications module 160, and the like. The power management module 141 may be further configured to monitor parameters such as a battery capacity, a quantity of battery cycles, and a battery health status (electric leakage or impedance). In some other embodiments, the power management module 141 may alternatively be disposed in the processor 110. In some other embodiments, the power management module 141 and the charging management module 140 may alternatively be disposed in a same component.

A wireless communication function of the electronic device 100 may be implemented through the antenna 1, the antenna 2, the mobile communications module 150, the wireless communications module 160, the modem processor, the baseband processor, and the like.

The antenna 1 and the antenna 2 are configured to: transmit and receive electromagnetic wave signals. Each antenna in the electronic device 100 may be configured to cover one or more communication frequency bands. Different antennas may be further multiplexed, to improve antenna utilization. For example, the antenna 1 may be multiplexed as a diversity antenna in a wireless local area network. In some other embodiments, the antenna may be used in combination with a tuning switch.

The mobile communications module 150 may provide a wireless communication solution that includes 2G/3G/4G/5G or the like and that is applied to the electronic device 100. The mobile communications module 150 may include at least one filter, a switch, a power amplifier, a low noise amplifier (LNA), and the like. The mobile communications module 150 may receive an electromagnetic wave through the antenna 1, perform processing such as filtering or amplification on the received electromagnetic wave, and transmit the electromagnetic wave to the modem processor for demodulation. The mobile communications module 150 may further amplify a signal modulated by the modem processor, and convert the signal into an electromagnetic wave for radiation through the antenna 1. In some embodiments, at least some functional modules in the mobile communications module 150 may be disposed in the processor 110. In some embodiments, at least some functional modules in the mobile communications module 150 may be disposed in a same device as at least some modules in the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal through an audio device (which is not limited to the speaker 170A, the receiver 170B, or the like), or displays an image or a video through the display 194. In some embodiments, the modem processor may be an independent component. In some other embodiments, the modem processor may be independent of the processor 110, and is disposed in a same device as the mobile communications module 150 or another functional module.

The wireless communications module 160 may provide a wireless communication solution that includes a wireless local area network (WLAN) (for example, a wireless fidelity (Wi-Fi) network), Bluetooth (BT), a global navigation satellite system (GNSS), frequency modulation (FM), near field communication (NFC), an infrared (IR) technology, or the like and that is applied to the electronic device 100. The wireless communications module 160 may be one or more components that integrate at least one communications processor module. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2.

In some embodiments, the antenna 1 and the mobile communications module 150 in the electronic device 100 are coupled, and the antenna 2 and the wireless communications module 160 in the electronic device 100 are coupled, so that the electronic device 100 can communicate with a network and another device by using a wireless communications technology. The wireless communications technology may include a global system for mobile communications (GSM), a general packet radio service (GPRS), code division multiple access wideband (CDMA), wideband code division multiple access (WCDMA), time-division code division multiple access (TD-CDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

The electronic device 100 implements a display function by using the GPU, the display 194, the application processor, and the like. The GPU is a microprocessor for image processing, and is connected to the display 194 and the application processor. The GPU is configured to: perform mathematical and geometric calculation, and render an image. The processor 110 may include one or more GPUs that execute program instructions to generate or change display information.

The display 194 is configured to display an image, a video, and the like. The display 194 includes a display panel. The display panel may be a liquid crystal display (LCD), an organic light-emitting diode (OLED), an active-matrix organic light emitting diode (AMOLED), a flexible light-emitting diode (FLED), a mini-LED, a micro-LED, a micro-OLED, a quantum dot light emitting diode (OLED), or the like. In some embodiments, the electronic device 100 may include one or N displays 194, where N is a positive integer greater than 1.

The electronic device 100 may implement a photographing function through the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (CCD) or a complementary metal-oxide-semiconductor (CMOS) photoelectric transistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transform and the like on frequency energy.

The video codec is configured to: compress or decompress a digital video. The electronic device 100 may support one or more video codecs. In this way, the electronic device 100 may play or record videos in a plurality of coding formats, for example, moving picture experts group (MPEG)-1, MPEG-2, MPEG-3, and MPEG-4.

The NPU is a neural-network (NN) computing processor. The NPU quickly processes input information by referring to a structure of a biological neural network, for example, a transfer mode between human brain neurons, and may further continuously perform self-learning. Applications such as intelligent cognition of the electronic device 100 may be implemented through the NPU, for example, image recognition, facial recognition, speech recognition, and text understanding.

The external memory interface 120 may be configured to connect to an external storage card, for example, a micro SD card, to extend a storage capability of the electronic device 100. The external storage card communicates with the processor 110 through the external memory interface 120, to implement a data storage function. For example, files such as music and videos are stored in the external storage card.

The internal memory 121 may be configured to store computer-executable program code. The executable program code includes instructions. The internal memory 121 may include a program storage area and a data storage area. The program storage area may store an operating system, an application required by at least one function (for example, a voice playing function or an image playing function), and the like. The data storage area may store data (for example, audio data and an address book) created during use of the electronic device 100, and the like. In addition, the internal memory 121 may include a high-speed random access memory, or may include a nonvolatile memory, for example, at least one magnetic disk storage device, a flash storage device, a universal flash storage (UFS), or the like. The processor 110 runs the instructions stored in the internal memory 121 and/or the instructions stored in the memory disposed in the processor, to perform various function applications of the electronic device 100 and data processing.

The electronic device 100 may implement an audio function, for example, music playing and recording, through the audio module 170, the speaker 170A, the receiver 170B, the microphone 170C, the headset jack 170D, the application processor, and the like.

The audio module 170 is configured to convert digital audio information into an analog audio signal output, and is also configured to convert an analog audio input into a digital audio signal. The audio module 170 may be further configured to: code and decode an audio signal. In some embodiments, the audio module 170 may be disposed in the processor 110, or some functional modules in the audio module 170 are disposed in the processor 110.

The speaker 170A, also referred to as a "horn", is configured to convert an electrical audio signal into a sound signal. The electronic device 100 may be used to listen to music or answer a call in a hands-free mode over the speaker 170A.

The receiver 170B, also referred to as an "earpiece", is configured to convert an electrical audio signal into a sound signal. When a call is answered or speech information is received through the electronic device 100, the receiver 170B may be put close to a human ear to listen to a voice.

The microphone 170C, also referred to as a "mike" or a "mic", is configured to convert a sound signal into an electrical signal. When making a call or sending a voice message, a user may make a sound near the microphone 170C through the mouth of the user, to input a sound signal to the microphone 170C. At least one microphone 170C may be disposed in the electronic device 100. In some other embodiments, two microphones 170C may be disposed in the electronic device 100, to collect a sound signal and implement a noise reduction function. In some other embodiments, three, four, or more microphones 170C may alternatively be disposed in the electronic device 100, to collect a sound signal, implement noise reduction, and identify a sound source, so as to implement a directional recording function and the like.

The headset jack 170D is configured to connect to a wired headset. The headset jack 170D may be the USB port 130, or may be a 3.5 mm open mobile terminal platform (OMTP) standard interface or a cellular telecommunications industry association of the USA (CTIA) standard interface.

The pressure sensor 180A is configured to sense a pressure signal, and may convert the pressure signal into an electrical signal. In some embodiments, the pressure sensor 180A may be disposed on the display 194.

There are a plurality of types of pressure sensors 180A, such as a resistive pressure sensor, an inductive pressure sensor, and a capacitive pressure sensor. The capacitive pressure sensor may include at least two parallel plates with conductive materials. When a force is applied to the pressure sensor 180A, capacitance between electrodes changes. The electronic device 100 determines pressure intensity based on the change in the capacitance. When a touch operation is performed on the display 194, the electronic device 100 detects intensity of the touch operation through the pressure sensor 180A. The electronic device 100 may also calculate a touch location based on a detection signal of the pressure sensor 180A. In some embodiments, touch operations that are performed at a same touch location but have different touch operation intensity may correspond to different operation instructions. For example, when a touch operation whose touch operation intensity is less than a first pressure threshold is performed on a Messages icon, an instruction for viewing an SMS message is executed. When a touch operation whose touch operation intensity is greater than or equal to the first pressure threshold is performed on a Messages icon, an instruction for creating a new SMS message is executed.

The gyro sensor 180B may be configured to determine a motion posture of the electronic device 100. In some embodiments, an angular velocity of the electronic device 100 around three axes (that is, axes x, y, and z) may be determined through the gyro sensor 180B. The gyro sensor 180B may be configured to implement image stabilization during photographing. For example, when the shutter is pressed, the gyro sensor 180B detects an angle at which the electronic device 100 jitters, calculates, based on the angle, a distance for which a lens module needs to compensate, and allows the lens to cancel the jitter of the electronic device 100 through reverse motion, to implement image stabilization. The gyro sensor 180B may also be used in a navigation scenario and a somatic game scenario.

The barometric pressure sensor 180C is configured to measure barometric pressure. In some embodiments, the electronic device 100 calculates an altitude based on a value of the barometric pressure measured by the barometric pressure sensor 180C, to assist in positioning and navigation.

The magnetic sensor 180D includes a Hall sensor. The electronic device 100 may detect opening and closing of a flip cover by using the magnetic sensor 180D. In some embodiments, when the electronic device 100 is a clamshell phone, the electronic device 100 may detect opening and closing of a flip cover based on the magnetic sensor 180D. Further, a feature such as automatic unlocking of the flip cover is set based on a detected opening or closing state of the flip cover.

The acceleration sensor 180E may detect accelerations in various directions (usually on three axes) of the electronic device 100. When the electronic device 100 is still, a magnitude and a direction of gravity may be detected. The acceleration sensor 180E may be further configured to identify a posture of the electronic device, and is used in an application such as switching between landscape mode and portrait mode or a pedometer.

The distance sensor 180F is configured to measure a distance. The electronic device 100 may measure the distance in an infrared manner or a laser manner. In some embodiments, in a photographing scenario, the electronic device 100 may measure a distance through the distance sensor 180F to implement quick focusing.

The optical proximity sensor 180G may include, for example, a light-emitting diode (LED) and an optical detector, for example, a photodiode. The light-emitting diode may be an infrared light-emitting diode. The electronic device 100 emits infrared light by using the light-emitting diode. The electronic device 100 detects infrared reflected light from a nearby object through the photodiode. When sufficient reflected light is detected, the electronic device 100 may determine that there is an object near the electronic device 100. When insufficient reflected light is detected, the electronic device 100 may determine that there is no object near the electronic device 100. The electronic device 100 may detect, by using the optical proximity sensor 180G, that the user holds the electronic device 100 close to an ear for a call, to automatically turn off a screen for power saving. The optical proximity sensor 180G may also be used in a flip cover mode or a pocket mode to automatically perform screen unlocking or locking.

The ambient light sensor 180L is configured to sense ambient light brightness. The electronic device 100 may adaptively adjust brightness of the display 194 based on the sensed ambient light brightness. The ambient light sensor 180L may also be configured to automatically adjust white balance during photographing. The ambient light sensor 180L may also cooperate with the optical proximity sensor 180G to detect whether the electronic device 100 is in a pocket, to avoid an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy through the temperature detected by the temperature sensor 180J. For example, when the temperature reported by the temperature sensor 180J exceeds a threshold, the electronic device 100 lowers performance of a processor near the temperature sensor 180J, to reduce power consumption for thermal protection. In some other embodiments, when the temperature is less than another threshold, the electronic device 100 heats the battery 142 to prevent the electronic device 100 from being shut down abnormally due to a low temperature. In some other embodiments, when the temperature is less than still another threshold, the electronic device 100 boosts an output voltage of the battery 142 to avoid abnormal shutdown due to a low temperature.

The touch sensor 180K is also referred to as a "touch panel". The touch sensor 180K may be disposed in the display 194, and the touch sensor 180K and the display 194 constitute a touchscreen. The touch sensor 180K is configured to detect a touch operation performed on or near the touch sensor. The touch sensor may transfer the detected touch operation to the application processor to determine a type of the touch event. A visual output related to the touch operation may be provided through the display 194. In some other embodiments, the touch sensor 180K may also be disposed on a surface of the electronic device 100 at a location different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a body pulse to receive a blood pressure beating signal. In some embodiments, the bone conduction sensor 180M may alternatively be disposed in the headset, to obtain a bone conduction headset. The audio module 170 may obtain a speech signal through parsing based on the vibration signal that is of the vibration bone of the vocal-cord part and that is obtained by the bone conduction sensor 180M, to implement a speech function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device 100 may receive a key input, and generate a key signal input related to a user setting and function control of the electronic device 100.

The motor 191 may generate a vibration prompt. The motor 191 may be configured to provide an incoming call vibration prompt and a touch vibration feedback. For example, touch operations performed on different applications (for example, photographing and audio playback) may correspond to different vibration feedback effects. The motor 191 may also correspond to different vibration feedback effects for touch operations performed on different areas of the display 194. Different application scenarios (for example, a time reminder, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards may be inserted into a same SIM card interface 195 at the same time. The plurality of cards may be of a same type or different types. The SIM card interface 195 is compatible with different types of SIM cards. The SIM card interface 195 is also compatible with an external storage card. The electronic device 100 interacts with a network through the SIM card, to implement functions such as conversation and data communication. In some embodiments, the electronic device 100 uses an eSIM, that is, an embedded SIM card. The eSIM card may be embedded in the electronic device 100, and cannot be separated from the electronic device 100.

A software system of the electronic device 100 may use a layered architecture, an event-driven architecture, a microkernel architecture, a micro service architecture, or a cloud architecture.

In embodiments of this application, an Android system with a layered architecture is used as an example to describe a software structure of the electronic device 100.

Figure 2:
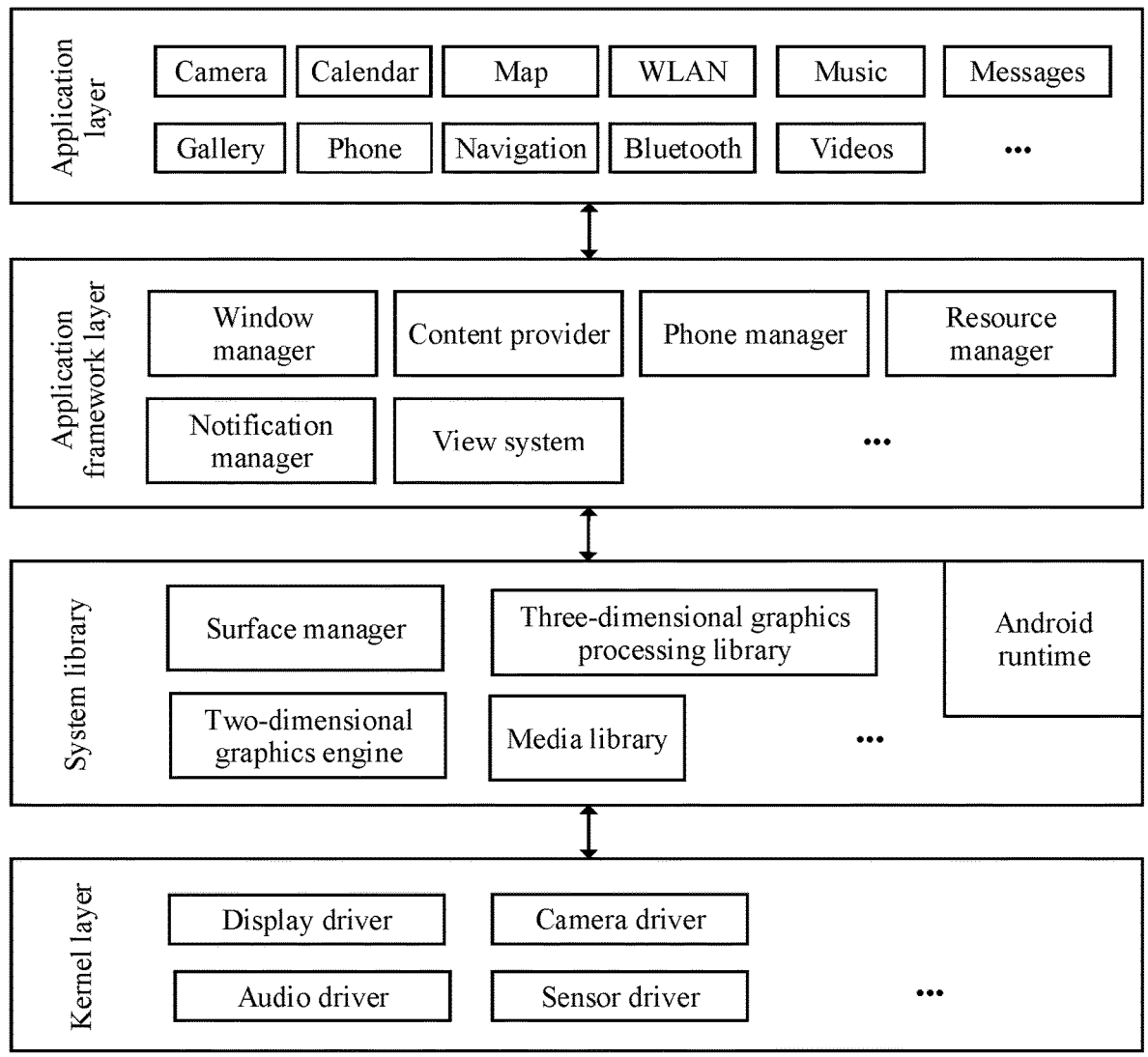
FIG. 2 is a block diagram of a software structure of an electronic device according to an embodiment of this application.

FIG. 2 is a block diagram of the software structure of the electronic device 100 according to an embodiment of this application.

In a layered architecture, software is divided into several layers, and each layer has a clear role and task. The layers communicate with each other through a software interface. In some embodiments, an Android system is divided into four layers: an application layer 210, an application framework layer 220, an Android runtime and system library 230, and a kernel layer 240 from top to bottom.

The application layer may include a series of application packages.

As shown in FIG. 2, the application packages may include applications such as Camera, Gallery, Calendar, Phone, Map, Navigation, WLAN, Bluetooth, Music, Videos, and Messages.

The application framework layer provides an application programming interface (API) and a programming framework for an application at the application layer. The application framework layer includes some predefined functions.

As shown in FIG. 2, the application framework layer may include a window manager, a content provider, a view system, a phone manager, a resource manager, a notification manager, and the like.

The window manager is configured to manage a window program. The window manager may obtain a size of the display, determine whether there is a status bar, perform screen locking, take a screenshot, and the like.

The content provider is configured to store and obtain data, and enable the data to be accessed by an application. The data may include a video, an image, an audio, calls that are made and answered, a browsing history and bookmarks, an address book, and the like.

The view system includes a visual control, such as a control for displaying a text or a control for displaying a picture. The view system may be configured to construct an application. A display interface may include one or more views. For example, a display interface including an SMS message notification icon may include a view for displaying a text and a view for displaying a picture.

The phone manager is configured to provide a communication function of the electronic device 100, for example, management of a call status (including answering, declining, or the like).

The resource manager provides various resources such as a localized character string, an icon, a picture, a layout file, and a video file for an application.

The notification manager enables an application to display notification information in a status bar, and may be configured to convey a notification message. The notification manager may automatically disappear after a short pause without user interaction. For example, the notification manager is configured to: notify download completion, provide a message notification, and the like. The notification manager may alternatively be a notification that appears in a top status bar of the system in a form of a graph or a scroll bar text, for example, a notification of an application that is run on a background, or may be a notification that appears on the screen in a form of a dialog window. For example, text information is displayed in the status bar, an announcement is given, the electronic device vibrates, or the indicator light blinks.

The Android runtime includes a core library and a virtual machine. The Android runtime is responsible for scheduling and management of the Android system.

The core library includes two parts: a function that needs to be invoked in Java language and a core library of Android.

The application layer and the application framework layer run on the virtual machine. The virtual machine executes Java files of the application layer and the application framework layer as binary files. The virtual machine is configured to implement functions such as object lifecycle management, stack management, thread management, security and exception management, and garbage collection.

The system library may include a plurality of functional modules, for example, a surface manager, a media library, a three-dimensional graphics processing library (for example, OpenGL ES), and a 2D graphics engine (for example, SGL).

The surface manager is configured to: manage a display subsystem and provide fusion of 2D and 3D layers for a plurality of applications.

The media library supports playback and recording in a plurality of commonly used audio and video formats, static image files, and the like. The media library may support a plurality of audio and video coding formats, for example, MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

The following describes an example of a working procedure of software and hardware of the electronic device 100 with reference to a photographing scenario.

When the touch sensor 180K receives a touch operation, a corresponding hardware interrupt is sent to the kernel layer. The kernel layer processes the touch operation into an original input event (including information such as touch coordinates and a timestamp of the touch operation). The original input event is stored at the kernel layer. The application framework layer obtains the original input event from the kernel layer, and identifies a control corresponding to the input event. For example, the touch operation is a single-tap touch operation and a control corresponding to the single-tap operation is a control of a camera application icon. A camera application invokes an interface at the application framework layer, so that the camera application is opened. Then, the camera driver is started by invoking the kernel layer, and a static image or a video is captured through the camera 193.

In the conventional technology, to implement a photographing preview effect, a thumbnail is usually displayed in a lower left corner of a photographing interface after photographing ends. Such a thumbnail is usually displayed in a fixed and static manner, and may be referred to as a stationary thumbnail (which may also be referred to as a conventional thumbnail in the conventional technology). A display region of such a stationary thumbnail is usually very small, and little information can be directly seen from the stationary thumbnail. Therefore, it cannot be determined whether a just taken photo has a problem such as blurring or underexposure, and a preview effect is poor. A user may enter an album by tapping the stationary thumbnail to view the just taken photo, and can perform an operation such as sharing or deletion on the just taken photo in the album application. After the viewing and the operation are completed, the user may return to a photographing interface of a photographing application to continue photographing.

It may be understood that implementing photo preview by using the conventional technology usually includes the following steps: taking a photo→a generation animation effect (usually scaling up or scaling down) of a (stationary) thumbnail→the thumbnail→tapping the thumbnail→entering an album application. An existing technical solution for implementing photo preview has the following disadvantages:

(1) Limited by a layout of a photographing interface (an interface of a photographing application), the stationary thumbnail is usually very small, and little information can be directly seen from the stationary thumbnail.

(2) Also limited by the layout of the photographing interface, there are few hot zones in which the stationary thumbnail is used as a button. Tapping the stationary thumbnail to enter the album application requires higher operation accuracy, and a higher response false-touch rate and a higher broken-touch rate.

(3) A function of the "generation animation effect of the thumbnail" is to provide feedback on a photographing operation of the user, and prompt the user with a fact that the photographing has just been completed. A smaller size of the thumbnail indicates a smaller amplitude of the generation animation effect and a weaker prompt effect given to the user.

In the conventional technology, if an operation needs to be performed on a just taken photo, usually, the operation can be implemented only after a stationary thumbnail is first tapped to enter an album application. Steps of the operation usually include: tapping a thumbnail→entering an album application→performing an operation such as sharing or deletion→returning to a photographing application. It is clear that the steps of this operation have the following obvious problems:

(1) The album application needs to be entered to view a just taken photo. Such cross-application switching easily breaks a sense of immersion and increases cognitive costs of "tracking" in a use process of a user.

(2) Based on usage data, most urgent operations of the user are to delete and share the just taken photo. However, in the conventional technology, to jump to the album application to perform the two operations, a large quantity of operation steps need to be performed.

In view of this, embodiments of this application provide the following solutions.

After a user takes a photo, a floating thumbnail with a larger size is generated at a display location of an original stationary thumbnail, so that the user performs preview, and directly performs operations such as tapping and sliding by using the floating thumbnail. It may be understood that different from a stationary thumbnail in the conventional technology, the floating thumbnail has a dynamic floating effect. The floating effect can better attract attention of the user, and in combination with size improvement, a better prompt effect can be achieved. The floating effect may be implemented by using a breathing animation effect. The breathing animation effect may be an alternate operation of continuously scaling down and scaling up an image during display, or a cyclic operation of reciprocating the image in one direction during display. It may be understood that, the floating effect of the floating thumbnail may be implemented through the alternate operation of continuously scaling down and scaling up the image, or may be implemented in a manner of the cyclic operation of reciprocating the image in one direction. In an embodiment, the floating thumbnail attracts attention of the user by presenting a breathing display effect, and reminds the user that photographing has just been completed. The user may perform an operation on the floating thumbnail to immediately open a just taken photo, delete the photo, share the photo, add the photo to favorites, and edit the photo. The floating effect may be presented within a specified time period of a generation and display phase of the floating thumbnail. For example, the floating effect is presented within 1 second of the generation and display phase (a phase in which the floating thumbnail is generated and displayed in a photographing interface), and is no longer presented after 1 second.

In an embodiment, a photo preview effect can be better achieved by using a floating thumbnail. Compared with a stationary thumbnail, the floating thumbnail has a larger display region, so that a user can obtain more image information, to determine whether a just taken photo has a problem such as blurring or underexposure, and provide a more accurate preview effect for the user, so as to perform an operation such as sharing or deletion more quickly. In addition, a floating effect of the floating thumbnail can also provide a better preview effect, and can remind the user to perform an operation on the floating thumbnail in a timely manner, to improve efficiency of processing the taken photo by the user.

Figure 3:
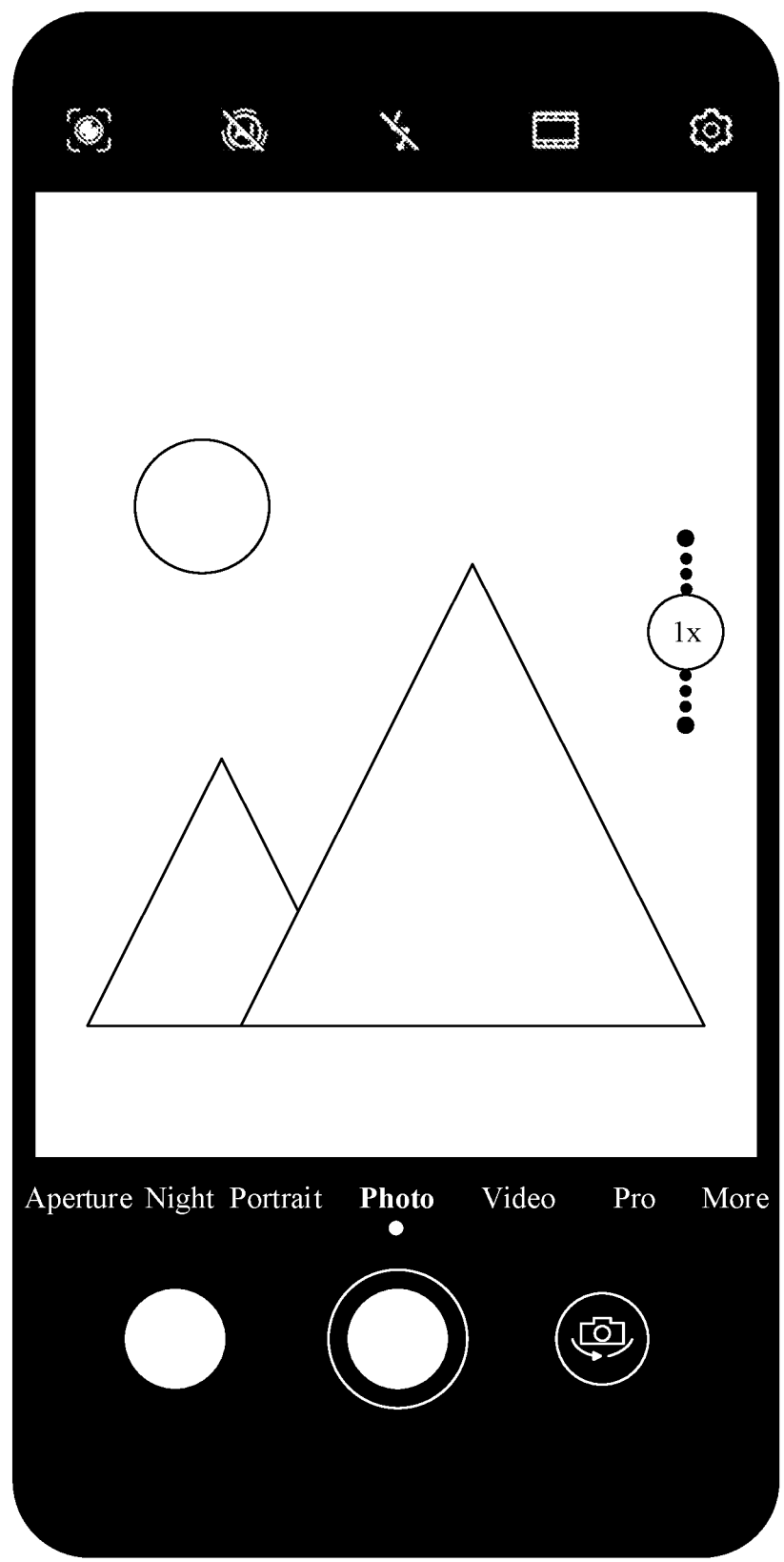
FIG. 3 is a diagram of a photographing scenario in the conventional technology according to an embodiment of this application.
Figure 4:
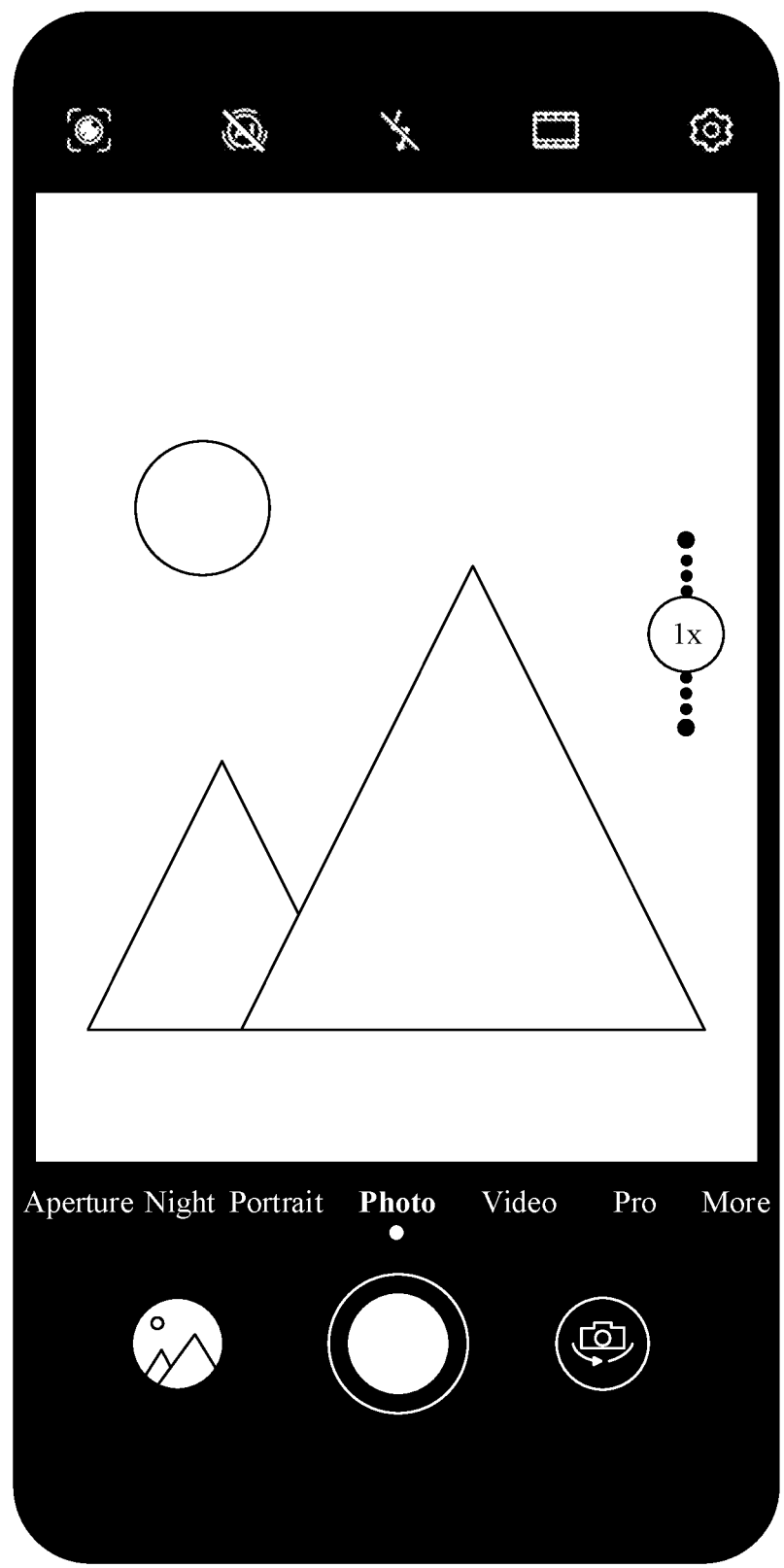
FIG. 4 is a diagram of a scenario in which a stationary thumbnail is generated after photographing in the conventional technology according to an embodiment of this application.

FIG. 3 is a diagram of a photographing scenario in the conventional technology. It can be learned from FIG. 3 that a user performs photographing by using a photographing button in the middle below a photographing viewfinder frame. An area on the left of the photographing button is an area in which a stationary thumbnail is displayed in the conventional technology. FIG. 4 is a diagram of a scenario in which a stationary thumbnail is generated after photographing in the conventional technology. A viewfinder interface of a photographing viewfinder frame is a picture currently to be photographed by a camera, and a stationary thumbnail is generated in an area on the left of a photographing button. The stationary thumbnail is very small, and limited information is obtained from the stationary thumbnail.

Therefore, it cannot be determined whether a just taken photo has a problem such as blurring or underexposure, and a preview effect is poor. If a user expects to tap the stationary thumbnail, a false touch easily occurs, and operability is also poor.

Figure 5:
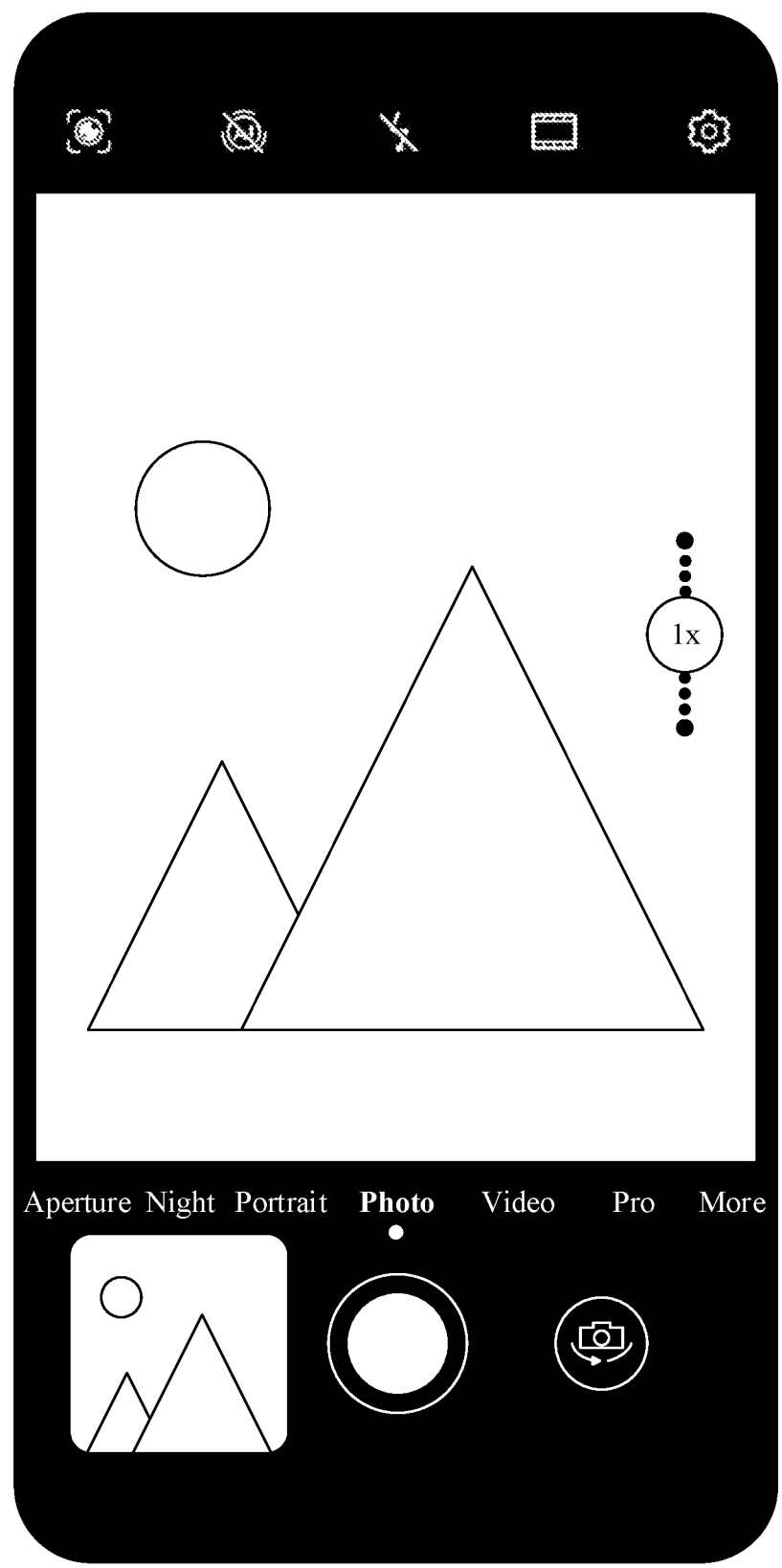
FIG. 5 is a diagram of a scenario in which a floating thumbnail is generated after photographing according to an embodiment of this application.
Figure 6:
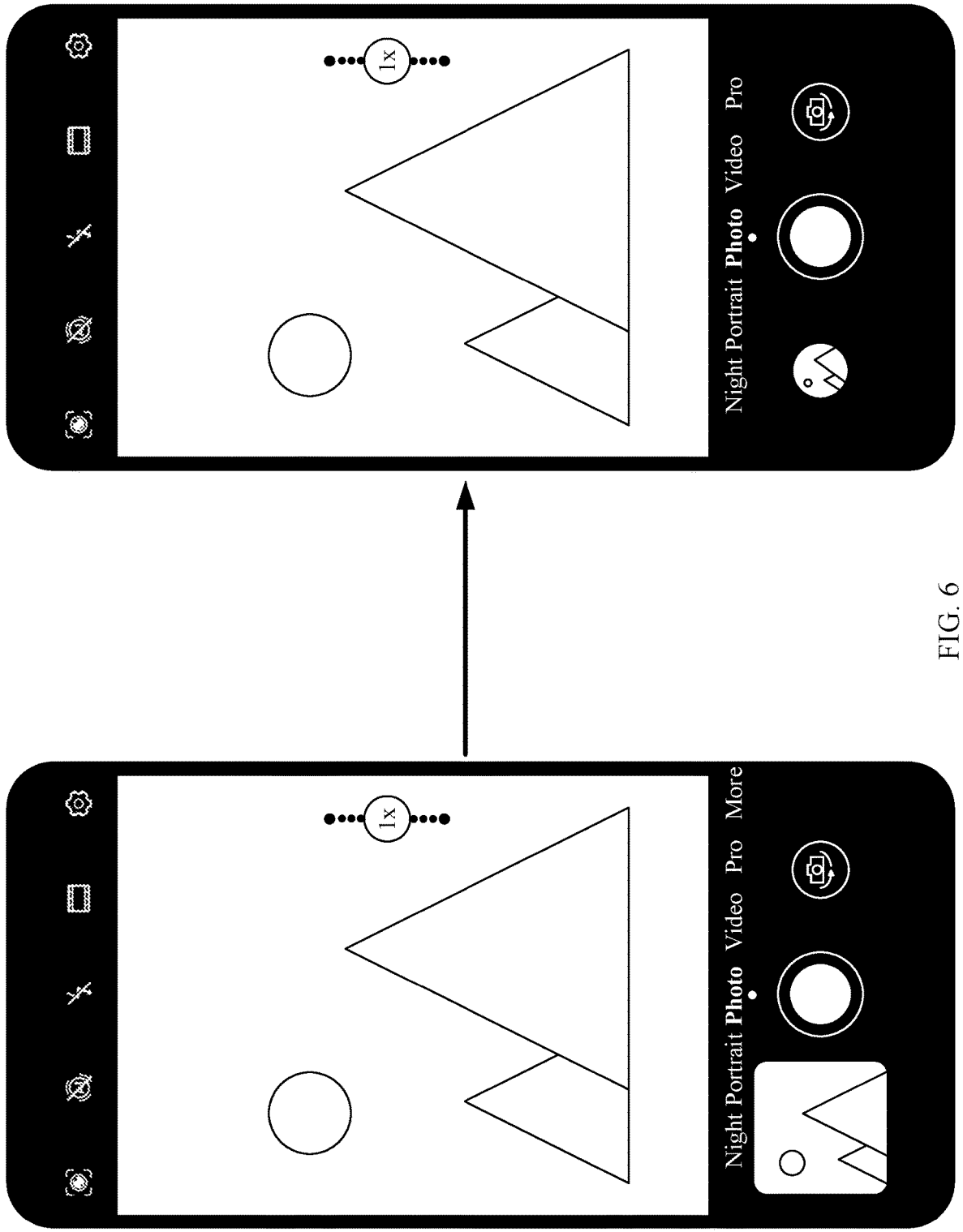
FIG. 6 is a diagram of a scenario in which a floating thumbnail is scaled down to a stationary thumbnail after photographing according to an embodiment of this application.

FIG. 5 is a diagram of a scenario in which a floating thumbnail is generated after photographing. It can be learned from FIG. 5 that a display region of the floating thumbnail covers a display region of a stationary thumbnail, and the display region of the floating thumbnail is much larger. A user may obtain more information from the floating thumbnail, to preliminarily determine whether a photographing effect of a just taken photo is ideal, and does not need to tap the stationary thumbnail each time to enter an album application to view the just taken photo. The floating thumbnail has a floating effect, and can effectively remind the user that photographing has just been completed. Further, display duration of the floating thumbnail may be preset. For example, the floating thumbnail is displayed within a preset time period of 2 seconds, and the floating thumbnail is scaled down to the stationary thumbnail after 2 seconds. FIG. 6 is a diagram of a scenario in which a floating thumbnail is scaled down to a stationary thumbnail after photographing. It may be understood that, after a preset time period expires, it may be considered that a user temporarily does not need to perform an operation on the floating thumbnail. To reduce visual interference of the user and perform subsequent photographing, the floating thumbnail may be scaled down to the stationary thumbnail with a smaller size.

Further, a process of generating the floating thumbnail includes a corresponding generation special effect. The generation special effect may be: scaling down a photo displayed in a viewfinder interface of a photographing viewfinder frame and moving the photo to a preset display region of the floating thumbnail, that is, scaling down a taken photo from the viewfinder interface to the preset display region of the floating thumbnail. Alternatively, the generation special effect may be: scaling up and putting the scaled-down just taken photo in the preset display region of the floating thumbnail, so that a size of the scaled-up photo is consistent with a size of the preset display region, that is, a generation effect of the floating thumbnail is implemented by using a scaling up dynamic effect, where a size of the scaled-down first photo is less than the size of the preset display region.

It may be understood that duration of the floating effect of the floating thumbnail usually needs to be shorter than display duration of the floating thumbnail. For example, the duration of the floating effect of the floating thumbnail is usually 0.5 second to 1 second, and the display duration of the floating thumbnail is usually 2 seconds to 3 seconds. When the duration of the floating effect of the floating thumbnail is shorter than the display duration of the floating thumbnail, attention of the user can be more attracted, and a prompt effect can be improved.

Further, the floating thumbnail may also be scaled down, with a dynamic effect, to the stationary thumbnail, and the dynamic effect may be a scaling down dynamic.

It may be understood that continuous photographing performed by the user is a common photographing scenario. When the user performs photographing again within a preset time period (for example, 2 seconds), that is, before the floating thumbnail disappears (changes to the stationary thumbnail), optionally, the following implementations are included:

(1) When a photo is taken again, the currently displayed floating thumbnail is scaled down immediately, and a new floating thumbnail is generated. Further, a dynamic effect of scaling down the old floating thumbnail and a dynamic effect of generating the new floating thumbnail may be simultaneously played. It may be understood that the floating thumbnail has specific time validity, and a floating thumbnail of a photo taken later is ranked on the top. Because space of a photographing interface is limited, usually, only one floating thumbnail is allowed to be displayed. After the user takes a latest photo, a floating thumbnail of the newly taken photo immediately replaces the currently displayed floating thumbnail.

Figure 7:
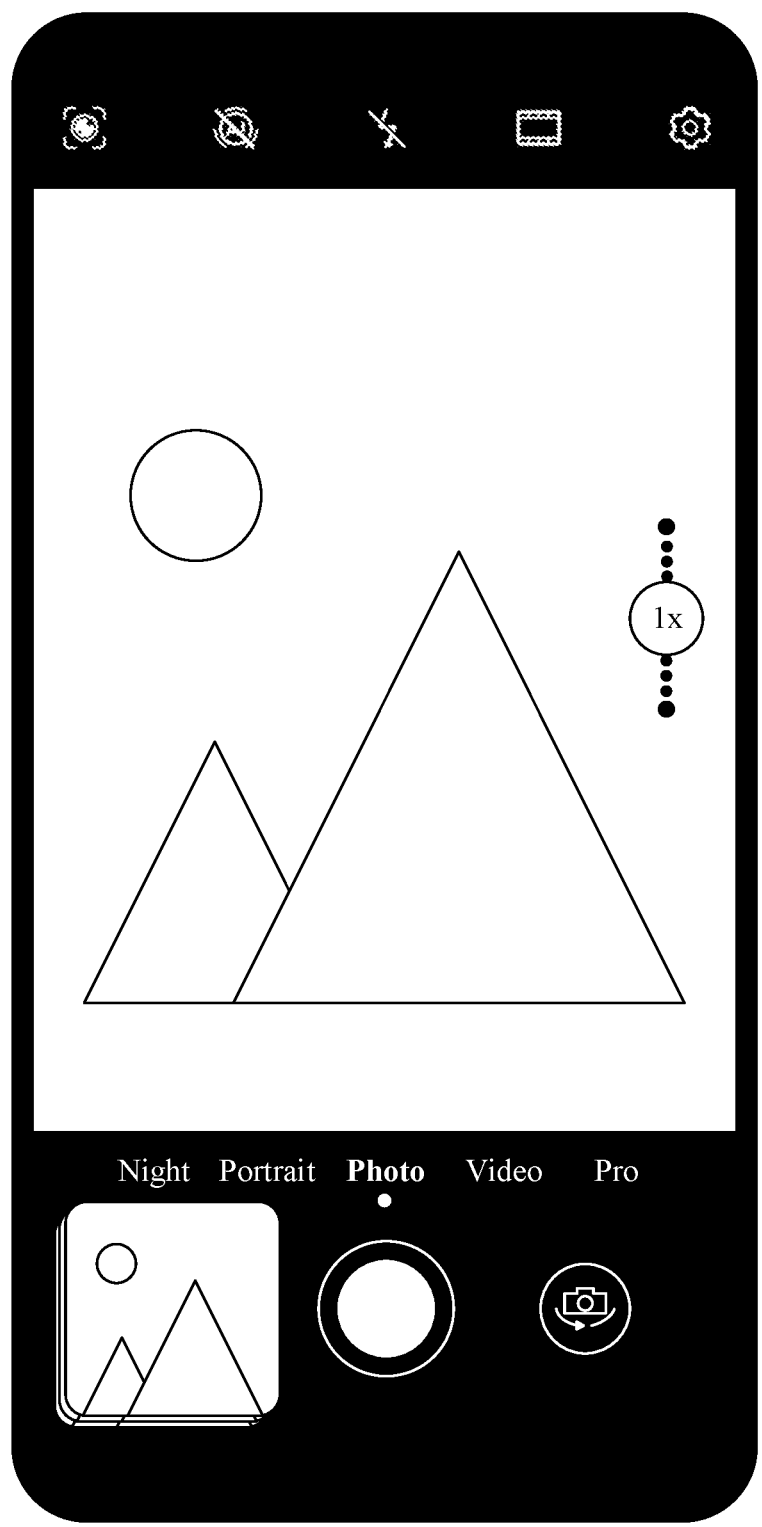
FIG. 7 is a diagram of a scenario in which a plurality of floating thumbnails overlap according to an embodiment of this application.

(2) When a photo is taken again, a new floating thumbnail partially covers an old floating thumbnail. FIG. 7 is a diagram of a scenario in which a plurality of floating thumbnails overlap. It can be learned from FIG. 7 that the overlapping floating thumbnails are slightly misaligned with each other, to form a thick look. A quantity of displayed floating thumbnails is usually limited. As shown in FIG. 7, the quantity of displayed floating thumbnails is usually 3, to perform an operation on a floating thumbnail at a latest photographing time. When staying duration of each floating thumbnail reaches a preset time period, each floating thumbnail is automatically scaled down to a stationary thumbnail.

Figure 8:
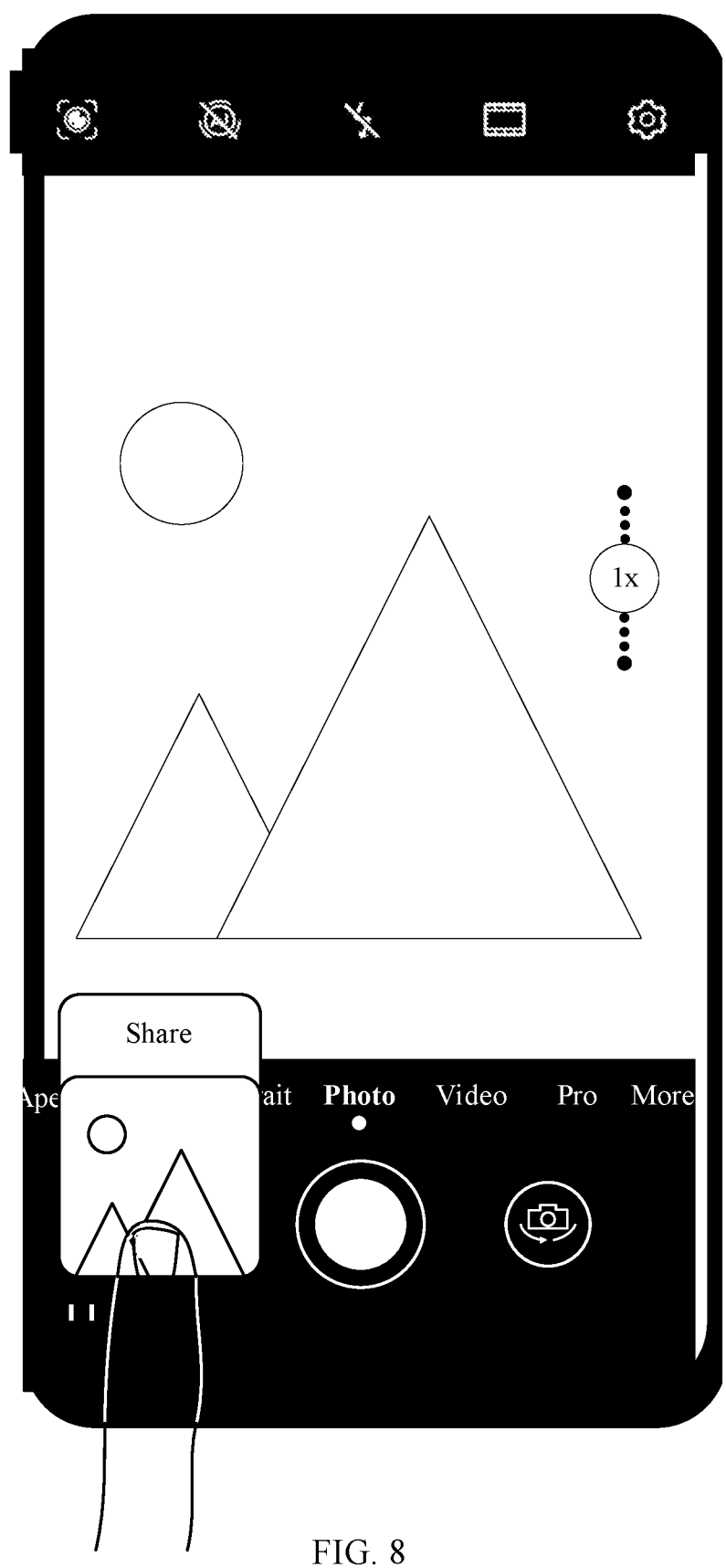
FIG. 8 is a diagram of an operation of sliding a floating thumbnail upward to trigger a share function according to an embodiment of this application.

Further, the floating thumbnail seems to be better than the stationary thumbnail, and operability of the floating thumbnail is also greatly improved. FIG. 8 is a diagram of an operation of sliding a floating thumbnail upward to trigger a share function. When a user performs a sliding up operation, the floating thumbnail moves upward along a vertical direction with a finger, to present a sliding up effect. It can be learned from FIG. 8 that the share function can be triggered when the user slides the floating thumbnail upward. When a sliding speed reaches a first threshold or a sliding distance reaches a second threshold, the share function of the floating thumbnail is triggered. The sliding speed may be an instantaneous speed at an instant at which an image sliding operation instruction is lost, and the sliding distance may be a sliding displacement from an instant at which the image sliding operation instruction is obtained to the instant at which the image sliding operation instruction is lost. It may be understood that, an electronic device records a corresponding instantaneous speed at an instant at which the user slides upward and releases a finger and uses the corresponding instantaneous speed as the sliding speed, and uses, as the sliding distance, a sliding displacement within a time period from a time point at which the user slides upward to a time point at which the user releases a finger. The sliding speed and the sliding distance are respectively compared with the first threshold and the second threshold. When the sliding speed reaches (is greater than or equal to) the first threshold or the sliding distance reaches the second threshold, the share function of the floating thumbnail is triggered.

Before a real-time sliding distance reaches the second threshold, a first function prompt is displayed above the floating thumbnail, where the first function prompt is used to prompt the user with a sharing operation to be performed when the sliding distance reaches the second threshold, that is, the sliding displacement within the time period from the time point at which the user slides upward to the time point at which the user releases a finger is greater than or equal to the second threshold. When the image sliding operation instruction is not lost, the real-time sliding distance is a sliding displacement corresponding to a time period from an instant at which an image sliding operation instruction is obtained to the current moment, that is, a current sliding distance is recorded before the user releases a finger. Further, a display effect of the first function prompt is improved as the real-time sliding distance increases, where the first function prompt includes a function prompt of a text type and a function prompt of an icon type. For example, the first function prompt is the function prompt of the text type, for example, "Share" shown in FIG. 8. In a process in which the user slides the floating thumbnail upward, the "Share" function prompt gradually changes from high transparency to low transparency. As the user slides upward, the "Share" function prompt becomes clearer.

Figure 9:
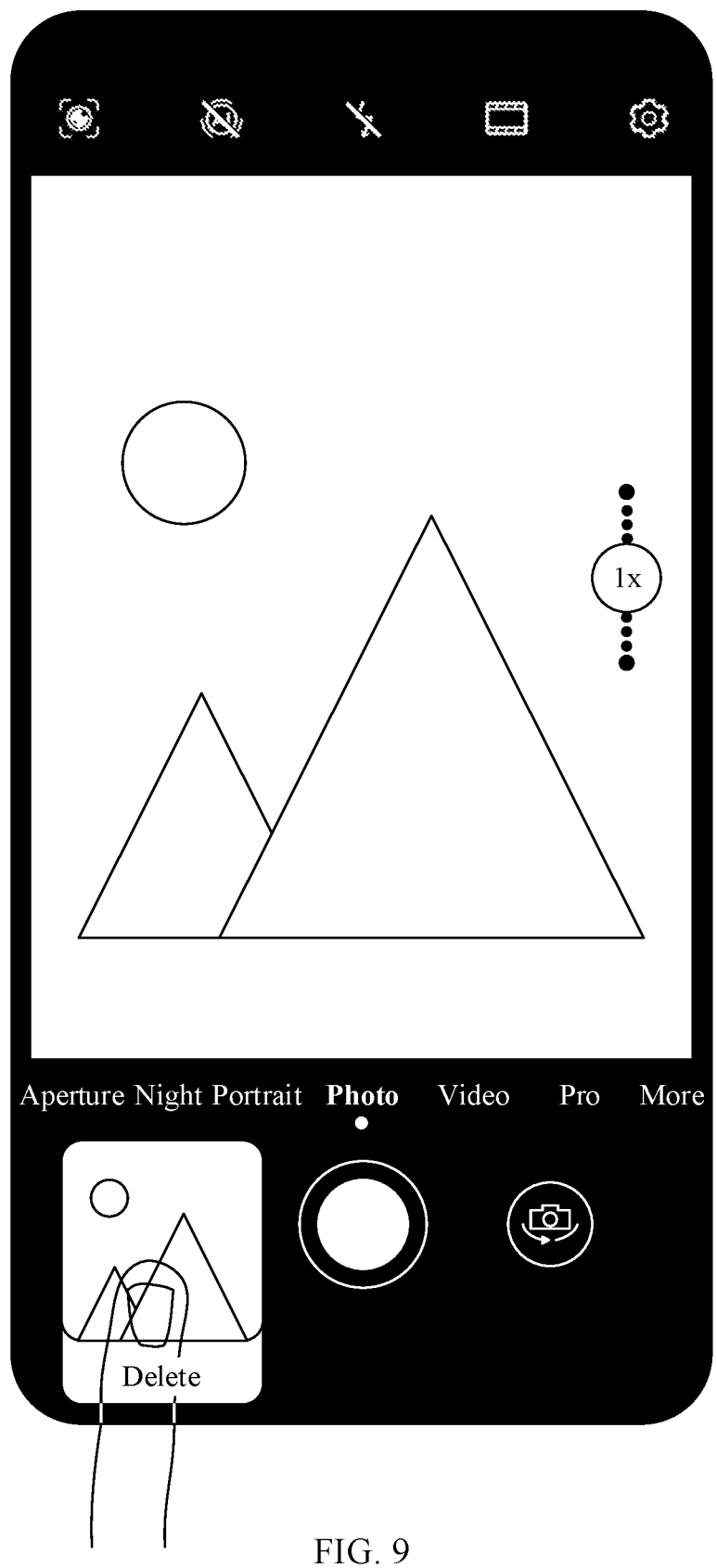
FIG. 9 is a diagram of an operation of sliding a floating thumbnail downward to trigger a delete function according to an embodiment of this application.

FIG. 9 is a diagram of an operation of sliding a floating thumbnail downward to trigger a delete function. When a user performs a sliding down operation, the floating thumbnail moves downward along a vertical direction with a finger, to present a sliding down effect. It can be learned from FIG. 9 that the delete function can be triggered when the user slides the floating thumbnail downward. When a sliding speed reaches a third threshold or a sliding distance reaches a fourth threshold, the delete function of floating thumbnail is triggered. It may be understood that, an electronic device records a corresponding instantaneous speed at an instant at which the user slides downward and releases a finger and uses the corresponding instantaneous speed as the sliding speed, and uses, as the sliding distance, a sliding displacement within a time period from a time point at which the user slides downward to a time point at which the user releases a finger. The sliding speed and the sliding distance are respectively compared with the third threshold and the fourth threshold. When the sliding speed reaches (is greater than or equal to) the third threshold or the sliding distance reaches the fourth threshold, the delete function of the floating thumbnail is triggered. Before a real-time sliding distance reaches the fourth threshold, a second function prompt is displayed below the floating thumbnail, where the second function prompt is used to prompt the user with a deletion operation to be performed when the sliding distance reaches the fourth threshold, a display effect of the second function prompt is improved as the real-time sliding distance increases, and the second function prompt includes a function prompt of a text type and a function prompt of an icon type. For example, the second function prompt is the function prompt of the text type, for example, "Delete" shown in FIG. 9. In a process in which the user slides the floating thumbnail downward, the "Delete" function prompt gradually changes from high transparency to low transparency. As the user slides upward, the "Share" function prompt becomes clearer.

In an embodiment, before the floating thumbnail disappears, the user may perform a shortcut operation on the floating thumbnail by sliding upward or downward. Optionally, the operation includes but is not limited to sliding upward for a specific distance (for example, sliding upward for a distance threshold exceeding 30 dp) and then releasing to trigger a share function; and sliding downward for a specific distance (for example, sliding downward for a distance threshold exceeding 30 dp) and then releasing to trigger a function of deleting the photo. When the distance threshold is reached or approached, a corresponding function prompt is displayed. As the sliding distance increases, the prompt gradually appears (as shown in FIG. 8 and FIG. 9, a distance at which a white prompt box is exposed above or below the floating thumbnail is mapped to a distance at which the finger slides, and the prompt box is gradually completely exposed with the sliding up or down operation).

In an embodiment, a function triggered by sliding the floating thumbnail is not limited to a share function or a delete function, and may be further a function such as adding to favorites, editing, or setting as wallpaper. The function triggered by sliding the floating thumbnail is changeable, and a triggering function corresponding to a sliding operation such as a sliding up operation or a sliding down operation may be determined based on a user setting.

In an embodiment, in the case shown in FIG. 7, that is, when the plurality of floating thumbnails overlap with each other, the sliding up or down operation may be set to take effect only on the first thumbnail (displayed on the top). For example, when the first floating thumbnail is shared by sliding upward, the second floating thumbnail becomes the first floating thumbnail and is displayed on the top. When the first floating thumbnail is deleted by sliding downward, the second floating thumbnail becomes the first floating thumbnail and is displayed on the top. Further, in a sliding up or down operation process, a countdown within a preset time period (for example, 2 seconds) of each floating thumbnail is paused. After an operation such as deletion performed on the first floating thumbnail ends, countdown duration within a preset time period of a remaining floating thumbnail is refreshed. Refreshing refers to restarting timing, that is, the countdown duration changes to 2 seconds again, to perform an operation on the remaining floating thumbnail.

In this embodiment of this application, a just taken photo can be directly deleted and shared in the photographing interface more conveniently, fewer operation steps are required, and a sense of immersion is not broken by jumping to an album application.

Further, the floating thumbnail may retain a function of entering the album application by performing a tapping operation. The image tapping operation instruction entered by the user is obtained, so that a photo corresponding to the floating thumbnail may be opened according to the image tapping operation instruction. It may be understood that, compared with the stationary thumbnail, the floating thumbnail has a larger visible area, and can intuitively and directly preview an imaging effect (for example, whether the image is blurred or underexposed). In addition, because the floating thumbnail exists in a transient state, other functions in the interface and aesthetics of the interface are not affected. It may be understood that after photographing, tapping a thumbnail to view details is a very high-frequency operation. Compared with the stationary thumbnail, the floating thumbnail has a larger tapping area and requires lower operation accuracy. Therefore, the floating thumbnail can be easily tapped and viewed, and a problem that the floating thumbnail is not exactly tapped and no response is made is not likely to occur.

It may be understood that the image operation instruction obtained in the display region of the floating thumbnail includes an image tapping operation instruction and an image sliding operation instruction, the sliding operation instruction includes an image sliding up operation instruction and an image sliding down operation instruction, the image tapping operation instruction is obtained based on a tapping operation in the display region of the floating thumbnail, and the image sliding operation instruction is obtained based on a sliding operation in the display region of the floating thumbnail. Alternatively, the image operation instruction may be another type of instruction, for example, a gesture operation instruction. This is not limited herein. The image sliding operation instruction is not limited to the image sliding up operation instruction and the image sliding down operation instruction, and may also be a sliding instruction in another direction such as an image sliding left operation instruction and an image sliding right operation instruction. This is not limited herein. An operation corresponding to the image sliding up operation instruction is not necessarily a share function, or may be a delete function. An image sliding operation and an implemented function are not limited herein.

Figure 10:
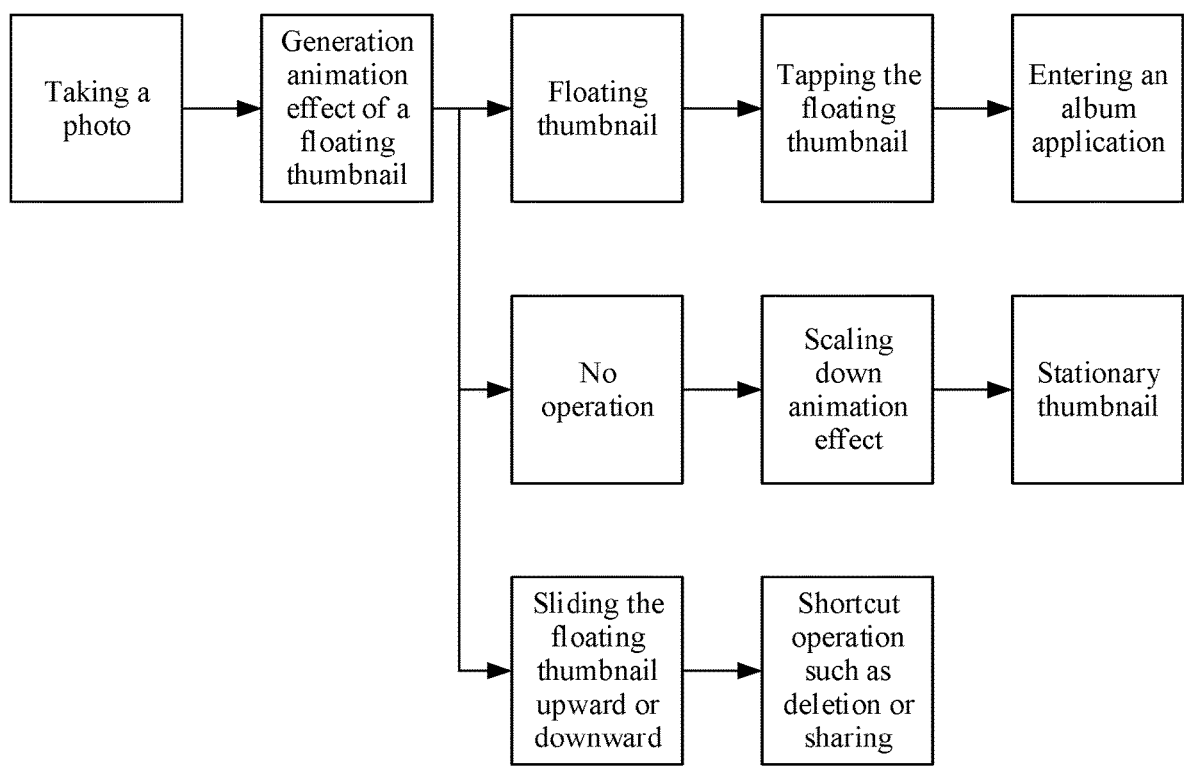
FIG. 10 is a flowchart of a photographing operation according to an embodiment of this application.

FIG. 10 is a flowchart of a photographing operation.

It can be learned from FIG. 10 that after a floating thumbnail is generated, there are three processing manners, including: 1. tapping the floating thumbnail→entering an album application; 2. no operation→a scaling down animation effect→a stationary thumbnail; 3. sliding the floating thumbnail upward or downward→performing a shortcut operation such as sharing or deletion.

In the foregoing embodiments, a function of sharing the photo corresponding to the floating thumbnail is implemented by sliding upward, and a function of deleting the photo corresponding to the floating thumbnail is implemented by sliding downward. In an embodiment, performing an image sliding operation on the floating thumbnail includes the following implementation:

if the image sliding up operation instruction is obtained in the display region of the floating thumbnail within the preset time period, displaying, according to the image sliding up operation instruction, a popover preview based on the floating thumbnail when a sliding speed reaches a fifth threshold or a sliding distance reaches a sixth threshold, where the sliding speed may be an instantaneous speed at an instant at which the image sliding operation instruction is lost, and the sliding distance may be a sliding displacement from an instant at which the image sliding operation instruction is obtained to the instant at which the image sliding operation instruction is lost. It may be understood that, an electronic device records a corresponding instantaneous speed at an instant at which the user slides upward and releases a finger and uses the corresponding instantaneous speed as the sliding speed, and uses, as the sliding distance, a sliding displacement within a time period from a time point at which the user slides upward to a time point at which the user releases a finger. The sliding speed and the sliding distance are respectively compared with the fifth threshold and the sixth threshold. When the sliding speed reaches (is greater than or equal to) the fifth threshold or the sliding distance reaches the sixth threshold, the popover preview is displayed based on the floating thumbnail.

Figure 11:
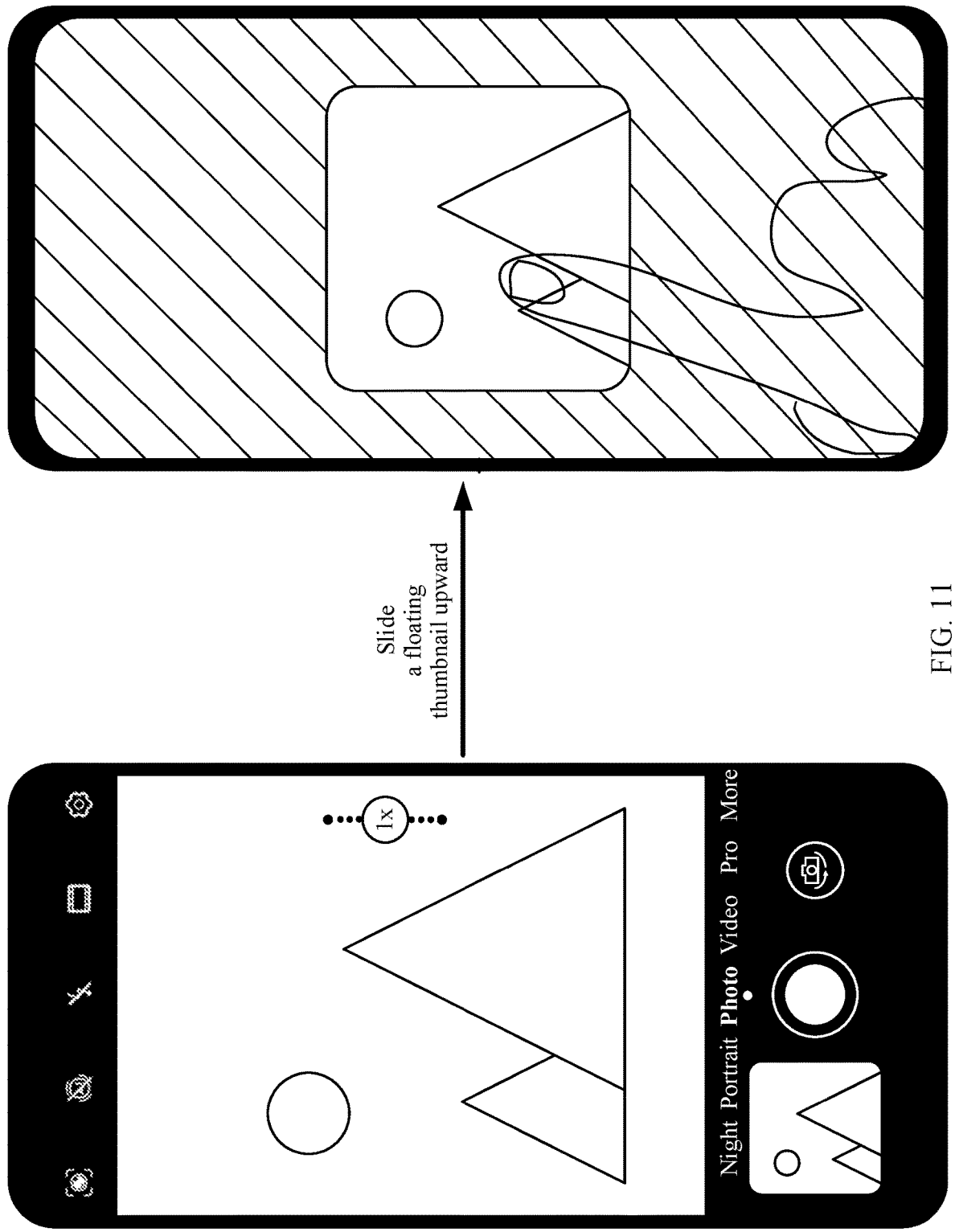
FIG. 11 is a diagram of a scenario in which a popover preview is displayed by sliding a floating thumbnail upward according to an embodiment of this application.

FIG. 11 is a diagram of a scenario in which a popover preview is displayed by sliding a floating thumbnail upward. It can be learned from FIG. 11 that after a user slides upward to display the popover preview, the floating thumbnail has a finger-following animation effect of sliding upward with a finger to scale up the floating thumbnail to the popover preview, and the floating thumbnail is scaled up for display.

Figure 12:
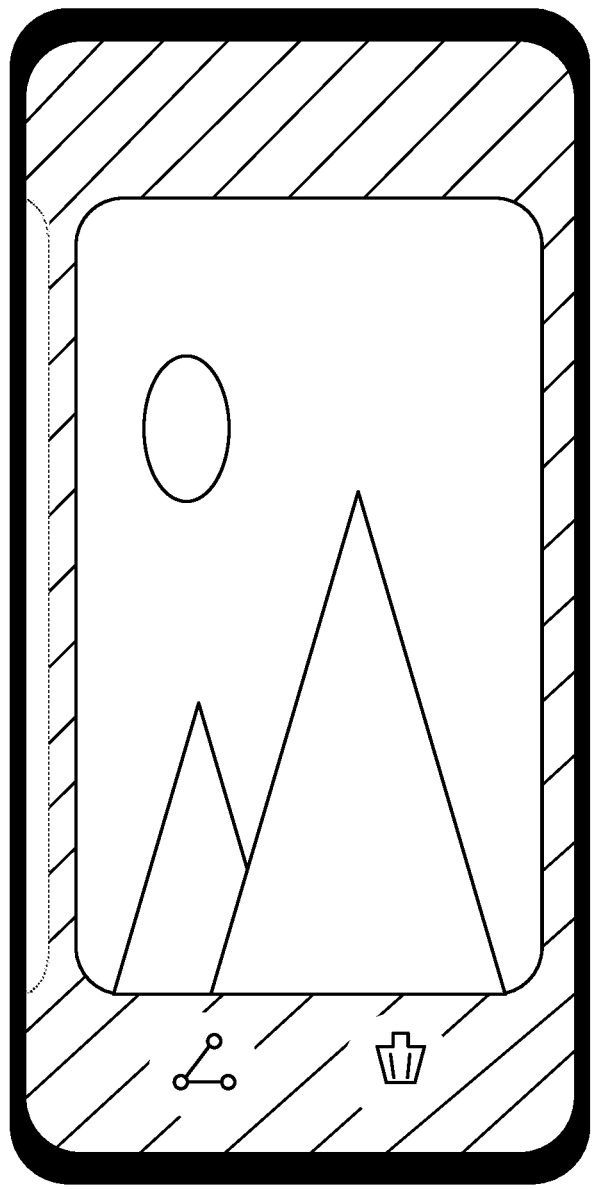
FIG. 12 is a diagram of another scenario in which a popover preview is displayed by sliding a floating thumbnail upward according to an embodiment of this application.

FIG. 12 is a diagram of another scenario in which a popover preview is displayed by sliding a floating thumbnail upward. It can be learned from FIG. 11 and FIG. 12 that the floating thumbnail is scaled up and moves to a preset display region of the popover preview after sliding upward. It may be understood that the floating thumbnail is scaled up or replaced in the preset display region of the popover preview, and the popover preview is displayed in a preset size corresponding to the popover preview. The floating thumbnail has an animation effect of scaling up or replacing the floating thumbnail with the popover preview after releasing.

It may be understood that the popover preview has a popover effect. When the popover preview is displayed, a display background of the photographing interface is displayed in a blurred manner. In FIG. 11 and FIG. 12, slash lines are used to represent the display background in which a photographing background is displayed in a blurred manner, to achieve the popover effect. When the user slides the floating thumbnail upward, the photographing background is displayed in a blurred manner, so that the user can better view the popover preview. Further, if the user expects to return to the photographing interface, the user may tap a blank region other than a control and an image on a screen to implement returning.

It may be understood that the popover preview is much larger than the floating thumbnail, and is smaller than the photo corresponding to the floating thumbnail. However, the user can obtain sufficient information from the popover preview, and does not need to specially jump to an album application, so that a better preview effect can be implemented by using the popover preview.

Further, a function control may be disposed at a location such as a location below the popover preview, including a share button and a delete button shown in FIG. 12. The user can conveniently implement a share function or a delete function by tapping the share button and the delete button.

Further, in a case in which there are the plurality of floating thumbnails shown in FIG. 7, when a quantity of floating thumbnails that are of photos and that are displayed in the photographing interface is greater than 1, the image operation instruction is performed on a floating thumbnail that is of a photo and that is displayed on the top of the photographing interface. It may be understood that tapping and sliding operations of the user are effective for the floating thumbnail displayed on the top of the photographing interface.

When a popover preview is displayed according to the image sliding up operation instruction based on the floating thumbnail that is of the photo and that is displayed on the top, the popover preview is displayed based on the quantity of floating thumbnails of the photos, where switching of the popover preview is implemented by obtaining a left sliding instruction or a right sliding instruction.

FIG. 12 is a diagram of a scenario in which a popover preview is displayed by sliding upward when there are a plurality of floating thumbnails.

It can be learned from FIG. 12 that when there is at least one floating thumbnail, the popover preview displayed by sliding upward may be displayed in a tiled manner. Further, switching of the popover preview may be implemented by sliding leftward or rightward. In an embodiment, as shown in FIG. 12, there is an edge of another popover preview on the left of the popover preview displayed in the center. The user may learn, by using the edge, that there is another popover preview on the left of the popover preview displayed in the center. The popover preview on the left may be displayed in the center of the screen by sliding rightward.

Further, a share control and a delete control are displayed below the popover preview. When the user taps the share button or the delete button, a share or delete function is applied to the currently displayed popover preview, that is, takes effect on the current popover preview in the center of the screen.

If the image sliding down operation instruction is obtained in the display region of the floating thumbnail within the preset time period, the floating thumbnail is scaled down to the stationary thumbnail according to the image sliding down operation instruction when a sliding speed reaches a seventh threshold or a sliding distance reaches an eighth threshold, where the sliding speed may be an instantaneous speed at an instant at which the image sliding operation instruction is lost, and the sliding distance may be a sliding displacement from an instant at which the image sliding operation instruction is obtained to the instant at which the image sliding operation instruction is lost. It may be understood that, an electronic device records a corresponding instantaneous speed at an instant at which the user slides downward and releases a finger and uses the corresponding instantaneous speed as the sliding speed, and uses, as the sliding distance, a sliding displacement within a time period from a time point at which the user slides downward to a time point at which the user releases a finger. The sliding speed and the sliding distance are respectively compared with the seventh threshold and the eighth threshold. When the sliding speed reaches (is greater than or equal to) the seventh threshold or the sliding distance reaches the eighth threshold, the floating thumbnail is scaled down to the stationary thumbnail.

In an embodiment, when the user slides the floating thumbnail downward, the sliding speed reaches the seventh threshold or the sliding distance reaches the eighth threshold, and the floating thumbnail is directly scaled down to the stationary thumbnail, where a scaling down process includes a scaling down animation effect.

It may be understood that a manner in which the popover preview is displayed by sliding the floating thumbnail upward is more conducive to performing large-image preview on a plurality of just taken photos, facilitating comparison and viewing when a group of a plurality of photos are continuously taken, and deleting unnecessary photos.

In embodiments of this application, photo preview is implemented by using the floating thumbnail. Compared with a thumbnail in the conventional technology, the floating thumbnail has a larger display area. This helps the user determine quality of a just taken photo from the floating thumbnail in a preview scenario, and can further improve tapping efficiency. The floating thumbnail further has a dynamic floating effect, and the user may pay more sensitive attention to generation of the floating thumbnail, to perform more operations based on the floating thumbnail. In embodiments of this application, a photo preview effect is significantly improved.

It should be understood that sequence numbers of the steps do not mean an execution sequence in the foregoing embodiments. The execution sequence of the processes should be determined based on functions and internal logic of the processes, and should not constitute any limitation on the implementation processes of embodiments of this application.

This embodiment provides an electronic device (the electronic device 100 shown in FIG. 1), including a memory, a processor, and a computer program that is stored in the memory and that can be run on the processor. When executing the computer program, the processor implements steps of the photo preview display method in embodiments, including:

obtaining a photographing 0000000 instruction, and taking a first photo according to the photographing instruction;

displaying a floating thumbnail of the first photo in a photographing interface based on the first photo, where the floating thumbnail has a floating effect; and scaling down the floating thumbnail to a stationary thumbnail if an image operation instruction is not obtained in a display region of the floating thumbnail within a preset time period; or performing an operation on the floating thumbnail according to the image operation instruction if the image operation instruction is obtained in the display region of the floating thumbnail within the preset time period.

Further, the image operation instruction includes an image tapping operation instruction and an image sliding operation instruction, the sliding operation instruction includes an image sliding up operation instruction and an image sliding down operation instruction, the image tapping operation instruction is obtained based on a tapping operation in the display region of the floating thumbnail, and the image sliding operation instruction is obtained based on a sliding operation in the display region of the floating thumbnail.

Further, when the processor executes the computer program to perform the operation on the floating thumbnail according to the image operation instruction if the image operation instruction is obtained in the display region of the floating thumbnail within the preset time period, the following steps are included:

if the image tapping operation instruction is obtained in the display region of the floating thumbnail within the preset time period, opening, according to the image tapping operation instruction, the first photo corresponding to the floating thumbnail; or performing an operation on the floating thumbnail according to the image sliding operation instruction if the image sliding operation instruction is obtained in the display region of the floating thumbnail within the preset time period.

Further, when the processor executes the computer program to perform the operation on the floating thumbnail according to the image sliding operation instruction if the image sliding operation instruction is obtained in the display region of the floating thumbnail, the following steps are included:
- if the image sliding up operation instruction is obtained in the display region of the floating thumbnail within the preset time period, sharing, according to the image sliding up operation instruction when a sliding speed reaches a first threshold or a sliding distance reaches a second threshold, the first photo corresponding to the floating thumbnail; or
- if the image sliding down operation instruction is obtained in the display region of the floating thumbnail within the preset time period, deleting, according to the image sliding down operation instruction when a sliding speed reaches a third threshold or a sliding distance reaches a fourth threshold, the first photo corresponding to the floating thumbnail.

Further, if the image sliding up operation instruction is obtained in the display region of the floating thumbnail, before the sliding distance reaches the second threshold, a first function prompt is displayed above the floating thumbnail, where the first function prompt is used to prompt a user with an operation to be performed when the sliding distance reaches the second threshold, a display effect of the first function prompt is improved as the sliding distance increases, and the first function prompt includes a function prompt of a text type and a function prompt of an icon type.

Further, if the image sliding down operation instruction is obtained in the display region of the floating thumbnail, before the sliding distance reaches the fourth threshold, a second function prompt is displayed below the floating thumbnail, where the second function prompt is used to prompt a user with an operation to be performed when the sliding distance reaches the fourth threshold, a display effect of the second function prompt is improved as the sliding distance increases, and the second function prompt includes a function prompt of a text type and a function prompt of an icon type.

Further, when the processor executes the computer program to perform the operation on the floating thumbnail according to the image sliding operation instruction if the image sliding operation instruction is obtained in the display region of the floating thumbnail, the following steps are included:
- if the image sliding up operation instruction is obtained in the display region of the floating thumbnail within the preset time period, displaying, according to the image sliding up operation instruction, a popover preview based on the floating thumbnail when a sliding speed reaches a fifth threshold or a sliding distance reaches a sixth threshold; or
- if the image sliding down operation instruction is obtained in the display region of the floating thumbnail within the preset time period, scaling down the floating thumbnail to the stationary thumbnail according to the image sliding down operation instruction when a sliding speed reaches a seventh threshold or a sliding distance reaches an eighth threshold.

Further, when the processor executes the computer program to display the popover preview based on the floating thumbnail, the following steps are included:
- scaling up the floating thumbnail and moving the floating thumbnail to a preset display region of the popover preview, scaling up or replacing the floating thumbnail in the preset display region, and displaying the popover preview in a preset size, where when the popover preview is displayed, a sharing control and a deletion control are displayed below the popover preview.

Further, the processor executes the computer program to further implement the following steps:
- when the floating thumbnail of the first photo is displayed, if the photographing instruction is obtained again, taking a second photo according to the photographing instruction; and
- scaling down the displayed floating thumbnail of the first photo to the stationary thumbnail, and displaying a floating thumbnail of the second photo in the photographing interface based on the second photo, where a generation animation effect is used for displaying the floating thumbnail of the second photo, and a scaling down animation effect of scaling down the displayed floating thumbnail of the first photo to the stationary thumbnail and the generation animation effect of displaying the floating thumbnail of the second photo in the photographing interface are simultaneously played.

Further, the processor executes the computer program to further implement the following steps:
- when the floating thumbnail of the first photo is displayed, if the photographing instruction is obtained again, taking a second photo according to the photographing instruction; and
- displaying a floating thumbnail of the second photo in the photographing interface based on the second photo, where the floating thumbnail of the second photo partially covers the floating thumbnail of the first photo.

Further, the processor executes the computer program to further implement the following step:
- when the photographing instruction is continuously obtained and photos are continuously obtained within the preset time period, displaying floating thumbnails of the photos in the photographing interface based on the photos, where a quantity of displayed floating thumbnails of the photos does not exceed a ninth threshold.

Further, the processor executes the computer program to further implement the following step:
- when the quantity of floating thumbnails that are of the photos and that are displayed in the photographing interface is greater than 1, the image operation instruction is performed on a floating thumbnail that is of a photo and that is displayed on the top of the photographing interface; and
- when a sliding up operation or a sliding down operation is performed, according to the image sliding up operation instruction or the image sliding down operation instruction, on the floating thumbnail that is of the photo and that is displayed on the top, a countdown within the preset time period is suspended for all the floating thumbnails of the photos, and when a deletion operation is triggered, according to the image sliding down operation instruction, on the floating thumbnail that is of the photo and that is displayed on the top, the countdown within the preset time period is refreshed for a remaining floating thumbnail of a photo.

Further, the processor executes the computer program to further implement the following step:
- when the quantity of floating thumbnails that are of the photos and that are displayed in the photographing interface is greater than 1, the image operation instruction is performed on a floating thumbnail that is of a photo and that is displayed on the top of the photographing interface; and when a popover preview is displayed according to the image sliding up operation instruction based on the floating thumbnail that is of the photo and that is displayed on the top, the popover preview is displayed based on the quantity of floating thumbnails of the photos, where switching of the popover preview is implemented by obtaining a left sliding instruction or a right sliding instruction.

Further, the processor executes the computer program to further implement the following step:

the sharing control and the deletion control are displayed below the popover preview, and when a sharing instruction or a deletion instruction is obtained, the sharing instruction or the deletion instruction is performed on the currently displayed popover preview.

Further, when the processor executes the computer program to display the floating thumbnail of the first photo in the photographing interface based on the first photo, where the floating thumbnail has the floating effect, the following steps are included:

scaling down the first photo displayed in a viewfinder interface of a photographing viewfinder frame, and moving the first photo to a preset display region of the floating thumbnail; or restoring the viewfinder interface of the photographing viewfinder frame, and scaling up and putting the scaled-down first photo in the preset display region of the floating thumbnail, so that a size of the scaled-up first photo is consistent with a size of the preset display region, where a size of the scaled-down first photo is less than the size of the preset display region.

the floating effect is implemented by using a breathing animation effect, the breathing animation effect is used for the floating thumbnail of the first photo within a specified time period of a generation and display phase, and the breathing animation effect is an alternate operation of continuously scaling down and scaling up an image during display.

Further, when the popover preview is displayed, a display background of the photographing interface is displayed in a blurred manner.

In embodiments of this application, photo preview is implemented by using the floating thumbnail. Compared with a thumbnail in the conventional technology, the floating thumbnail has a larger display area. This helps the user determine quality of a just taken photo from the floating thumbnail in a preview scenario, and can further improve tapping efficiency. The floating thumbnail further has a dynamic floating effect, and the user may pay more sensitive attention to generation of the floating thumbnail, to perform more operations based on the floating thumbnail. In embodiments of this application, a photo preview effect is significantly improved.

This embodiment provides a nonvolatile computer-readable storage medium. The nonvolatile computer-readable storage medium stores a computer program. When the computer program is executed by a processor, the photo preview method in this embodiment is implemented. To avoid repetition, details are not described herein again.

It should be clear that the described embodiments are merely some rather than all of embodiments of this application. All other embodiments obtained by a person of ordinary skill in the art based on embodiments of this application without creative efforts shall fall within the protection scope of this application.

It may be clearly understood by a person skilled in the art that, for convenient and brief description, division into the foregoing functional units and modules is merely used as an example for description. In actual application, the foregoing functions can be allocated to different functional units and modules for implementation based on a requirement, that is, an inner structure of the apparatus is divided into different functional units or modules to implement all or some of the functions described above.

The foregoing embodiments are merely intended to describe the technical solutions of this application, but are not to limit this application. Although this application is described in detail with reference to the foregoing embodiments, a person of ordinary skill in the art should understand that the person of ordinary skill in the art may still make modifications to the technical solutions described in the foregoing embodiments or make equivalent replacements to some technical features thereof, without departing from the spirit and scope of the technical solutions of embodiments of this application, and these modifications and replacements shall fall within the protection scope of this application.

What is claimed is:

1. A photo preview method, comprising:
   obtaining a photographing instruction and taking a first photo according to the photographing instruction;
   displaying a floating thumbnail of the first photo in a photographing interface based on the first photo, the floating thumbnail having a floating effect, wherein when the photographing instruction is continuously obtained and photos are continuously obtained within the preset time period, displaying floating thumbnails of the photos in the photographing interface based on the photos, wherein a quantity of displayed floating thumbnails of the photos does not exceed a ninth threshold; and
   scaling down the floating thumbnail to a stationary thumbnail if an image operation instruction is not obtained in a display region of the floating thumbnail within a preset time period, or performing an operation on the floating thumbnail according to the image operation instruction if the image operation instruction is obtained in the display region of the floating thumbnail within the preset time period.

2. The method according to claim 1, wherein the image operation instruction comprises an image tapping operation instruction and an image sliding operation instruction, the image sliding operation instruction comprises an image sliding up operation instruction and an image sliding down operation instruction, the image tapping operation instruction is obtained based on a tapping operation in the display region of the floating thumbnail, and the image sliding operation instruction is obtained based on a sliding operation in the display region of the floating thumbnail.

3. The method according to claim 2, wherein the performing the operation on the floating thumbnail according to the image operation instruction if the image operation instruction is obtained in the display region of the floating thumbnail within the preset time period comprises:
   if the image tapping operation instruction is obtained in the display region of the floating thumbnail within the preset time period, opening, according to the image tapping operation instruction, the first photo corresponding to the floating thumbnail; or
   performing an image sliding operation on the floating thumbnail according to the image sliding operation instruction if the image sliding operation instruction is obtained in the display region of the floating thumbnail within the preset time period.

4. The method according to claim 3, wherein the performing the image sliding operation on the floating thumbnail according to the image sliding operation instruction if the image sliding operation instruction is obtained in the display region of the floating thumbnail within the preset time period comprises:
- if the image sliding up operation instruction is obtained in the display region of the floating thumbnail within the preset time period, sharing, according to the image sliding up operation instruction when a sliding speed reaches a first threshold or a sliding distance reaches a second threshold, the first photo corresponding to the floating thumbnail, wherein the sliding speed is an instantaneous speed at an instant at which the image sliding operation instruction is lost, and the sliding distance is a sliding displacement from an instant at which the image sliding operation instruction is obtained to the instant at which the image sliding operation instruction is lost; or
- if the image sliding down operation instruction is obtained in the display region of the floating thumbnail within the preset time period, deleting, according to the image sliding down operation instruction when the sliding speed reaches a third threshold or the sliding distance reaches a fourth threshold, the first photo corresponding to the floating thumbnail, wherein the sliding speed is an instantaneous speed at an instant at which the image sliding operation instruction is lost, and the sliding distance is the sliding displacement from an instant at which the image sliding operation instruction is obtained to the instant at which the image sliding operation instruction is lost.

5. The method according to claim 4, wherein if the image sliding up operation instruction is obtained in the display region of the floating thumbnail, before the sliding distance reaches the second threshold, a first function prompt is displayed above the floating thumbnail, the first function prompt prompting a user with an operation to be performed when the sliding distance reaches the second threshold, a display effect of the first function prompt is improved as the sliding distance increases, and the first function prompt comprises a function prompt of a text type and a function prompt of an icon type.

6. The method according to claim 4, wherein if the image sliding down operation instruction is obtained in the display region of the floating thumbnail, before the sliding distance reaches the fourth threshold, a second function prompt is displayed below the floating thumbnail, the second function prompt prompting a user with an operation to be performed when the sliding distance reaches the fourth threshold, a display effect of the second function prompt is improved as the sliding distance increases, and the second function prompt comprises a function prompt of a text type and a function prompt of an icon type.

7. The method according to claim 3, wherein the performing the operation on the floating thumbnail according to the image sliding operation instruction if the image sliding operation instruction is obtained in the display region of the floating thumbnail within the preset time period comprises:
- if the image sliding up operation instruction is obtained in the display region of the floating thumbnail within the preset time period, displaying, according to the image sliding up operation instruction, a popover preview based on the floating thumbnail when a sliding speed reaches a fifth threshold or a sliding distance reaches a sixth threshold, wherein the sliding speed is an instantaneous speed at an instant at which the image sliding operation instruction is lost, and the sliding distance is a sliding displacement from an instant at which the image sliding operation instruction is obtained to the instant at which the image sliding operation instruction is lost; or
- if the image sliding down operation instruction is obtained in the display region of the floating thumbnail within the preset time period, scaling down the floating thumbnail to the stationary thumbnail according to the image sliding down operation instruction when a sliding speed reaches a seventh threshold or a sliding distance reaches an eighth threshold, wherein the sliding speed is an instantaneous speed at an instant at which the image sliding operation instruction is lost, and the sliding distance is a sliding displacement from an instant at which the image sliding operation instruction is obtained to the instant at which the image sliding operation instruction is lost.

8. The method according to claim 7, wherein the displaying the popover preview based on the floating thumbnail comprises:
scaling up the floating thumbnail and moving the floating thumbnail to a preset display region of the popover preview, scaling up or replacing the floating thumbnail in the preset display region, and displaying the popover preview in a preset size, wherein when the popover preview is displayed, a sharing control and a deletion control are displayed below the popover preview.

9. The method according to claim 7, wherein when the popover preview is displayed, a display background of the photographing interface is displayed in a blurred manner.

10. The method according to claim 1, wherein the method further comprises:
when the floating thumbnail of the first photo is displayed, if the photographing instruction is obtained again, taking a second photo according to the photographing instruction; and
scaling down the displayed floating thumbnail of the first photo to the stationary thumbnail, and displaying a second floating thumbnail of the second photo in the photographing interface based on the second photo, wherein a generation animation effect is used for displaying the second floating thumbnail of the second photo, and a scaling down animation effect of scaling down the displayed floating thumbnail of the first photo to the stationary thumbnail and the generation animation effect of displaying the second floating thumbnail of the second photo in the photographing interface are simultaneously displayed.

11. The method according to claim 1, wherein the method further comprises:
when the floating thumbnail of the first photo is displayed, if the photographing instruction is obtained again, taking a second photo according to the photographing instruction; and
displaying a second floating thumbnail of the second photo in the photographing interface based on the second photo, wherein the second floating thumbnail of the second photo partially covers the floating thumbnail of the first photo.

12. The method according to claim 1, wherein the method further comprises:
when the quantity of floating thumbnails that are of the photos and that are displayed in the photographing interface is greater than 1, the image operation instruction is performed on a particular floating thumbnail that is of a particular photo and that is displayed on the top of the photographing interface; and when a sliding up operation or a sliding down operation is performed, according to the image sliding up operation instruction or the image sliding down operation instruction, on the particular floating thumbnail that is of the particular photo and that is displayed on the top, a countdown within the preset time period is suspended for all the floating thumbnails of the photos, and when a deletion operation is triggered, according to the image sliding down operation instruction, on the particular floating thumbnail that is of the particular photo and that is displayed on the top, the countdown within the preset time period is refreshed for a remaining floating thumbnail of a photo.

13. The method according to claim 1, wherein the method further comprises:

when the quantity of floating thumbnails that are of the photos and that are displayed in the photographing interface is greater than 1, the image operation instruction is performed on the particular floating thumbnail that is of a particular photo and that is displayed on the top of the photographing interface; and when a popover preview is displayed according to the image sliding up operation instruction based on the particular floating thumbnail that is of the particular photo and that is displayed on the top, the popover preview is displayed based on the quantity of floating thumbnails of the photos, wherein switching of the popover preview is implemented by obtaining a left sliding instruction or a right sliding instruction.

14. The method according to claim 13, wherein the method further comprises:

the sharing control and the deletion control are displayed below the popover preview, and when a sharing instruction or a deletion instruction is obtained, the sharing instruction or the deletion instruction is performed on the currently displayed popover preview.

15. The method according to claim 1, wherein the displaying the floating thumbnail of the first photo in the photographing interface based on the first photo, the floating thumbnail having a floating effect comprises:

scaling down the first photo displayed in a viewfinder interface of a photographing viewfinder frame, and moving the first photo to a preset display region of the floating thumbnail; or restoring the viewfinder interface of the photographing viewfinder frame, and scaling up and putting the scaled-down first photo in the preset display region of the floating thumbnail, so that a size of the scaled-up first photo is consistent with a size of the preset display region, wherein a size of the scaled-down first photo is less than the size of the preset display region.

16. The method according to claim 1, wherein the floating effect is implemented by using a breathing animation effect, the breathing animation effect is used for the floating thumbnail of the first photo within a specified time period of a generation and display phase, and the breathing animation effect is an alternate operation of continuously scaling down and scaling up an image during display, or is a cyclic operation of reciprocating the image in one direction during display.

17. An electronic device, comprising:

a non-transitory memory storing instructions; and at least one processor in communication with the memory, the at least one processor configured, upon execution of the instructions, to perform the following steps:

obtaining a photographing instruction, and taking a first photo according to the photographing instruction;

displaying a floating thumbnail of the first photo in a photographing interface based on the first photo, the floating thumbnail having a floating effect, wherein when the photographing instruction is continuously obtained and photos are continuously obtained within the preset time period, displaying floating thumbnails of the photos in the photographing interface based on the photos, wherein a quantity of displayed floating thumbnails of the photos does not exceed a ninth threshold; and scaling down the floating thumbnail to a stationary thumbnail if an image operation instruction is not obtained in a display region of the floating thumbnail within a preset time period, or performing an operation on the floating thumbnail according to the image operation instruction if the image operation instruction is obtained in the display region of the floating thumbnail within the preset time period.

18. The electronic device according to claim 17, wherein the image operation instruction comprises an image tapping operation instruction and an image sliding operation instruction, the image sliding operation instruction comprises an image sliding up operation instruction and an image sliding down operation instruction, the image tapping operation instruction is obtained based on a tapping operation in the display region of the floating thumbnail, and the image sliding operation instruction is obtained based on a sliding operation in the display region of the floating thumbnail.

19. The electronic device according to claim 17, wherein the processor executes the computer program to further implement the following steps:

when the floating thumbnail of the first photo is displayed, if the photographing instruction is obtained again, taking a second photo according to the photographing instruction; and scaling down the displayed floating thumbnail of the first photo to the stationary thumbnail, and displaying a second floating thumbnail of the second photo in the photographing interface based on the second photo, wherein a generation animation effect is used for displaying the second floating thumbnail of the second photo, and a scaling down animation effect of scaling down the displayed floating thumbnail of the first photo to the stationary thumbnail and the generation animation effect of displaying the second floating thumbnail of the second photo in the photographing interface are simultaneously displayed.

\* \* \* \* \*